US 8,106,628 B2

(12) United States Patent
Kobayashi et al.

(10) Patent No.: US 8,106,628 B2
(45) Date of Patent: Jan. 31, 2012

(54) CAPACITOR CHARGING APPARATUS

(75) Inventors: Shinya Kobayashi, Kyoto (JP);
Yoshifumi Yamamichi, Kyoto (JP)

(73) Assignee: Rohm Co., Ltd. (JP)

( * ) Notice: Subject to any disclaimer, the term of this patent is extended or adjusted under 35 U.S.C. 154(b) by 0 days.

(21) Appl. No.: 13/012,015

(22) Filed: Jan. 24, 2011

(65) Prior Publication Data

US 2011/0115392 A1     May 19, 2011

Related U.S. Application Data

(62) Division of application No. 11/714,429, filed on Mar. 6, 2007, now Pat. No. 7,710,080.

(30) Foreign Application Priority Data

| Mar. 7, 2006 | (JP) | 2006-061686 |
| Mar. 7, 2006 | (JP) | 2006-061689 |
| Mar. 7, 2006 | (JP) | 2006-061692 |
| Jul. 5, 2006 | (JP) | 2006-186099 |

(51) Int. Cl.
*H02J 7/00*     (2006.01)
(52) U.S. Cl. ........................ 320/124; 320/166
(58) Field of Classification Search ............... 320/124, 320/166
See application file for complete search history.

(56) References Cited

U.S. PATENT DOCUMENTS

| 5,485,125 | A | * | 1/1996 | Dufour ........................ 331/17 |
| 6,049,471 | A | * | 4/2000 | Korcharz et al. ............. 363/20 |
| 7,292,005 | B2 | * | 11/2007 | Pietkiewicz et al. .......... 320/166 |
| 2005/0237032 | A1 | * | 10/2005 | Tan et al. ..................... 320/166 |
| 2006/0049806 | A1 | * | 3/2006 | Kobayashi et al. ........... 320/166 |
| 2006/0077697 | A1 | * | 4/2006 | Yang ........................ 363/21.13 |

FOREIGN PATENT DOCUMENTS

| JP | 5-38070 A | 2/1993 |
| JP | 6-41386 U | 5/1994 |
| JP | 2003-52173 A | 2/2003 |
| JP | 2003-79147 A | 3/2003 |
| JP | 2004-071428 A | 3/2004 |
| JP | 2005-183038 A | 7/2005 |

OTHER PUBLICATIONS

Japanese Office Action, Notification of Reason(s) for Refusal, for Japanese Patent Application No. 2006-061689, drafted Jul. 21, 2011, dispatched Jul. 26, 2011, with English translation.
Notificiation of Reason(s) for Refusal for Japanese Patent Application No. 2006-061692, drafted Jul. 25, 2011, mailed Aug. 2, 2011, with English translation.
Notification of Reason(s) for Refusal for Japanese Patent Application No. 2006-253883, dispatched Aug. 30, 2011, with English translation.
Notification of Reason(s) for Refusal for Japanese Patent Application No. 2006-186099, dispatched Aug. 30, 2011, with English translation.

* cited by examiner

*Primary Examiner* — M'Baye Diao
(74) *Attorney, Agent, or Firm* — Cantor Colburn LLP

(57) ABSTRACT

A capacitor charging apparatus includes a transformer and an output capacitor charged with current flowing through a secondary coil of the transformer, and charges the output capacitor by performing a switching control of a switching transistor provided on a path leading to a primary coil of the transformer. A switching control unit controls on and off of the switching transistor. A voltage detector monitors a voltage at a tap provided in the secondary coil of the transformer. The switching control unit regards the voltage detected by the voltage detector as an output voltage of the capacitor charging apparatus, and controls the on and off of the switching transistor.

12 Claims, 14 Drawing Sheets

60a

60b

210b

70a

CAPACITOR CHARGING APPARATUS

CROSS REFERENCE TO RELATED APPLICATIONS

The present application is a divisional application of U.S. patent application Ser. No. 11/714,429, filed on Mar. 6, 2007, the entire contents of which are incorporated herein by reference. The Ser. No. 11/714,429 application claimed the benefit of the dates of Mar. 7, 2006 to Japanese Application Nos. JP2006-061686; JP2006-061689; and JP2006-061692; and of Jul. 5, 2006 to Japanese Application No. JP2006-186099, the entire contents of which are incorporated herein by reference, and priority which is hereby claimed.

BACKGROUND OF THE INVENTION

1. Field of the Invention

The present invention relates to a switching power supply and, more particularly, to a capacitor charging apparatus for generating high voltage by charging a capacitor.

2. Description of the Related Art

In a variety of electronic equipment, a step-up switching power supply is used to supply a voltage higher than the input voltage to a load. Such a step-up switching power supply, which has a switching element and a transformer, outputs a boosted input voltage by producing a back electromotive force in the transformer by turning the switching element on and off in a time-division manner and charging an output capacitor with the current flowing through the secondary coil of the transformer.

An input voltage is applied to one end of the primary coil of the transformer, and the switching element is coupled to the other end thereof. The voltage at one end of the secondary coil of the transformer is fixed, and an output capacitor is coupled to the other end thereof via a rectifier diode.

With such a switching power supply, when a switching transistor, provided as the switching element, turns on, a current flows through the primary winding of the transformer, and energy is stored in the transformer. Then, as the switching transistor turns off, the energy stored in the transformer is supplied from the secondary side thereof and transferred as a charging current to the output capacitor via the rectifier diode. The output capacitor is thus charged by the repetition of on and off of the switching transistor, and the output voltage rises.

References (1) to (3) listed in the following Related Art List, for example, disclose control circuits for their respective self-excited capacitor charging devices that control the on and off of the switching transistor according to the monitored state of the primary and/or the secondary side of the transformer.

RELATED ART LIST (1) Japanese Patent Application Laid-Open No. 2003-79147.
(2) U.S. Pat. No. 6,518,733.
(3) U.S. Pat. No. 6,636,021.

Problem 1: A capacitor charging apparatus sometimes controls the circuit operation according to an output voltage appearing at the output capacitor. For example, the detection of the completion of charging, that is, whether an output voltage sufficient to drive a load has been generated or not, is carried out by monitoring the output voltage. According to Reference (1) above, for instance, the completion of charging is detected by monitoring the voltage across the primary coil of a transformer as a way of monitoring the output voltage indirectly.

However, since the correlation between the voltage across the primary coil of a transformer and the output voltage can vary with the turns ratio of the transformer or other conditions, such an arrangement presents a problem of inability to detect the output voltage accurately. As a result, there may be cases where a drive voltage sufficient to drive the load is not obtained or an overcharging beyond the necessary voltage occurs to consume electric power wastefully.

Also, where the output voltage appearing at the output capacitor is monitored directly by dividing it with resistors, it is necessary to use resistive elements that is capable of withstanding high voltage. And such a resistive elements capable of withstanding high voltage must be installed as a chip because it is difficult to incorporate it within an LSI. This results in a larger number of circuit components and thus a larger packaging area. Moreover, there may be cases where a diode must be installed backward to prevent the charge stored in the output capacitor from discharging to the ground via the resistive element.

Problem 2: The applicant of the present invention has come to realize the following problems in an investigation on a capacitor charging apparatus so configured that it can adjust the amount of charging current for the output capacitor.

If the charging current is varied at the capacitor charging apparatus, the current flowing through the switching element, which is provided to turn on and off the primary coil of the transformer and the primary current of the transformer, will also vary.

For example, when a bipolar transistor is used as the switching element, a base current must be intermittently supplied as a switching signal to the base thereof to turn it on and off. In this case, if the amplitude of the base current is fixed independent of the charging current (i.e., the collector current of the bipolar transistor), then there may be cases where current is spent wastefully or sufficient charging current cannot be obtained. The collector current of a bipolar transistor is subject to the influence of base current, and if more than necessary amount of base current is supplied for the required charging current (collector current), the excess base current will result in a wasteful consumption of electric power. Conversely, if less than necessary amount of base current is supplied for the required charging current, the collector current generated will be less than adequate, thus hindering the charging operation.

A similar problem may also arise when a MOSFET (Metal Oxide Semiconductor Field Effect Transistor) is used as the switching element. That is, the drain current of a MOSFET, which corresponds to the charging current, is subject to the influence of the gate voltage thereof, and if the amplitude of the gate voltage or the drive current relative to the gate capacitance is fixed independent of the charging current (drain current), then there may be cases where current is spent wastefully or sufficient charging current cannot be obtained.

Problem 3: The timing at which the switching transistor turns on and off in such a capacitor charging apparatus is a very important technical issue that influences the efficiency and the charging rate, which are generally in a trade-off relation with each other. For instance, the above-mentioned References (1) to (3) disclose control methods in which the on-timing of the switching transistor is determined according to the current flowing through the primary coil of a transformer and the off-timing of the switching transistor is determined according to the current flowing through the secondary coil thereof.

According to the method described in the above References, the switching transistor turns on at the timing when the current flowing through the secondary coil becomes sufficiently small, namely, at the timing when the energy stored in the transformer is discharged to an output capacitor. This method can enhance the utilization efficiency of energy. However, since in this method an off-time during which the switching transistor is turned off is determined by the energy stored in the transformer, there is a problem that the output capacitor cannot be charged rapidly.

SUMMARY OF THE INVENTION

1. An advantage of one embodiment of the present invention is to provide a capacitor charging apparatus capable of accurately detecting output voltage by use of a simple circuit structure.

One embodiment of the present invention relates to a control circuit of a capacitor charging apparatus, the capacitor charging apparatus including a transformer and an output capacitor charged with current flowing through a secondary coil of the transformer, which charges the output capacitor by performing a switching control of a switching transistor provided on a path leading to a primary coil of the transformer. This control circuit comprises: a switching control unit which controls on and off of the switching transistor; and a voltage detector which monitors a voltage at a tap provided on the secondary coil of the transformer. The switching control unit controls the on and off of the switching transistor by taking the voltage detected by the voltage detector as an output voltage of the capacitor charging apparatus.

A tap (F winding) is provided on the secondary of the transformer and the potential thereof is monitored, so that it is possible to detect with accuracy the voltage in response to the output voltage appearing at the capacitor. Also, the location of the tap is on the grounding side, namely the lower-voltage side, of the secondary coil. This arrangement makes it unnecessary to use resistance voltage division, thus avoiding any increase in the number of circuit components used. That is, the control circuit according to this embodiment can optimally perform switching control by monitoring the output voltage with accuracy.

The switching control unit may include a charging completion detector which detects completion of charging by comparing the voltage detected by the voltage detector with a predetermined threshold voltage. And when a completion of charging is detected, the switching control unit may stop the on and off of the switching transistor.

As described above, the voltage of the tap detected by the voltage detector is equal to a voltage corresponding to the output voltage. Hence, compared with the direct monitoring of the output voltage appearing at the output capacitor, this arrangement makes it possible to stop the switching by detecting a full charging state without any loss in accuracy.

The switching control unit may repeat an operation of turning on the switching transistor until current flowing through the primary coil of the transformer has reached a predetermined peak current and of then turning off the switching transistor during an off-time. In so doing, the off-time may be varied in response to the voltage detected by the voltage detector. The switching control unit may set the off-time in such a manner that the higher the voltage detected by the voltage detector is, the shorter the off-time becomes.

In such a case, the output voltage can be monitored with accuracy. Thus, the off-time of the switching transistor, namely the time during which the charging current is supplied to the output capacitor can be optimally controlled.

The switching control unit may include: a primary-current detection circuit which detects a primary current flowing through the primary coil of the transformer; a comparator which compares the primary current detected by the primary-current detection circuit with a predetermined peak current value and outputs a comparison signal of a predetermined level when the primary current exceeds the predetermined peak current value; an off-time setting circuit which begins to count an off-time when the comparison signal outputted from the comparator becomes the predetermined level; and a driver circuit which repeats an operation of turning off the switching transistor during a period of time in which the off-time is counted and turning on the switching transistor after the off-time has elapsed. The off-time setting circuit may vary the off-time in accordance with the voltage detected by the voltage detector. The off-time setting circuit may set the off-time in such a manner that the higher the voltage detected by the voltage detector is, the shorter the off-time is.

A control circuit according to an embodiment may be integrated on a single semiconductor substrate. "Being integrated" includes a case where all of circuit components are formed on a semiconductor substrate and a case where the main components of a circuit are integrated thereon. Note that part of resistors or capacitors used to adjust circuit constants may be provided outside the semiconductor substrate. Integrating the control circuit into a single LSI can reduce the circuit area.

Another embodiment of the present invention relates to a capacitor charging apparatus. This apparatus comprises: a transformer, including a primary coil and a secondary coil, wherein an input voltage is applied to one end of the primary coil and a switching transistor is connected to other end thereof; an output capacitor one end of which is grounded; a diode having an anode thereof connected to a second coil side of the transformer and a cathode thereof connected to the other-end side of the output capacitor; and a control circuit, according to any one of the above-described embodiments, which controls on and off of the switching transistor.

According to this embodiment, the switching control can be performed by detecting with accuracy the output voltage appearing at the output capacitor. Also, the packaging area can be reduced.

Still another embodiment of the present invention relates to a light emitting apparatus. This apparatus comprises: the above-described capacitor charging apparatus; and a light-emitting element driven by an output voltage appearing at the output capacitor in the capacitor charging apparatus. According to this embodiment, the packaging area and the number of circuit elements used for the capacitor charging apparatus are reduced, so that the apparatus can be easily mounted on a small-size set.

Still another embodiment of the present invention relates to an electronic apparatus. This electronic apparatus comprises: the above-described light emitting apparatus; and a control unit which controls an emitting state of the light emitting apparatus. According to this embodiment, the packaging area and the number of circuit elements used for the capacitor charging apparatus are reduced, so that the size of a casing for a set can be made smaller.

Still another embodiment of the present invention relates to a method for controlling a capacitor charging apparatus, including a transformer and an output capacitor charged with current flowing through a secondary coil of the transformer, which charges the output capacitor by performing a switching control of a switching transistor provided on a path leading to a primary coil of the transformer. This control method comprises: repeating: a first step of detecting a primary current flowing through the primary coil of the transformer; a second step of turning on the switching transistor until the detected primary current reaches a predetermined peak current; and a third step of turning off the switching transistor during an off-time wherein the third step comes after the second step; and a fourth step of detecting that a voltage at a tap provided on the secondary coil of the transformer has reached a predetermined threshold voltage. When the voltage at the tap has exceeded the predetermined threshold voltage, the repeating the first to the third step is stopped. In the third step the off-time may be set in accordance with the voltage at the tap provided on the secondary coil of the transformer.

2. Another advantage of embodiments of the present invention described hereinafter is to provide a control circuit capable of optimally driving a switching transistor in a capacitor charging apparatus where charging current is adjustable.

One embodiment of the present invention relates to a control circuit of a capacitor charging apparatus, the capacitor charging apparatus including a transformer and an output capacitor charged with current flowing through a secondary coil of the transformer, which charges the output capacitor by performing a switching control of a switching transistor provided on a path leading to a primary coil of the transformer. This control circuit comprises: a primary-current detection circuit which detects a primary current flowing through the primary coil of the transformer; and a switching control unit which monitors at least the primary current detected by the primary-current detection circuit and outputs to a control terminal of the switching transistor a switching signal for specifying ON to the switching transistor until the primary current reaches a predetermined peak current value and then specifying OFF to the switching transistor during an off-time. The switching control unit adjusts the switching signal outputted to the control terminal of the switching transistor, according to the predetermined peak current value.

According to this embodiment, the charging current is defined by a predetermined peak current value. With the structure in this embodiment, the switching signal most suitable for the on and off of the switching transistor can be supplied by adjusting the switching signal supplied to a control terminal of the switching transistor according to the predetermined peak current value.

The switching transistor may be a bipolar transistor, and the switching control unit may adjust a current value of a base current, which is supplied to a base of the bipolar transistor as the switching signal, in accordance with the predetermined peak current value. The switching control unit may set the current value of a base current in such a manner that the larger the predetermined peak current value is, the larger the current value of a base current becomes. Furthermore, the switching control unit may set the current value of a base current in such a manner the current value of a base current is proportional to the predetermined peak current value.

In such a case, the base current of the switching transistor is defined according to the charging current defined by the predetermined peak current value. As a result, the base current most suitable according to a collector current of the switching transistor can be supplied and therefore the efficiency of circuitry can be enhanced.

The switching control unit may include a current generator which receives a current adjustment signal specifying the predetermined peak current value and generates a current in accordance with the current adjustment signal, and the current generated by the current generator may be supplied to a base of the switching transistor as a switching signal in a period during which the switching transistor is to turn on.

The current adjustment signal may be inputted to a charge current control terminal provided in the control circuit, from outside the control circuit. With the structure in this embodiment, the charging current can be controlled from the outside and at the same time the control signal of the switching transistor can be adjusted according to a charging current set from the outside.

The switching control unit may monitor an output voltage appearing at the output capacitor and then adjust the off-time according to this output voltage. The output voltage may be monitored directly or indirectly. In such a case, when the output voltage immediately after a start of charging is low, the energy stored in the transformer can be used efficiently; and as the output voltage gets higher, the charging rate can be raised, so that the efficiency and the charging rate can be balanced.

Another embodiment of the present invention relates also to a control circuit of a capacitor charging apparatus, the capacitor charging apparatus including a transformer and an output capacitor charged with current flowing through a secondary coil of the transformer, which charges the output capacitor by performing a switching control of a switching transistor provided on a path leading to a primary coil of the transformer. This control circuit comprises: a current generator which generates a current according to the amount of a charging current for the output capacitor; and a driver circuit which supplies the current generated by the current generator as a base current of a bipolar transistor serving as the switching transistor, in a period during which the switching transistor is to turn on. The current generator may set the current value of a base current in accordance with a peak value of the charging current.

The control circuit in the capacitor charging apparatus may be integrated onto a single semiconductor substrate. "Being integrated" includes a case where all of circuit components are formed on a semiconductor substrate and a case where the main components of a circuit are integrated thereon. Note that part of resistors or capacitors used to adjust circuit constants may be provided outside the semiconductor substrate. Integrating the control circuit into a single LSI can reduce the circuit area.

Still another embodiment of the present invention relates to a capacitor charging apparatus. This apparatus comprises: a transformer, including a primary coil and a secondary coil, wherein an input voltage is applied to one end of the primary coil and a switching transistor is connected to other end thereof; an output capacitor one end of which is grounded; a diode having an anode thereof connected to a secondary coil side of the transformer and a cathode thereof connected to the other-end side of the output capacitor; and the above-described control circuit which controls on and off of the switching transistor.

According to this embodiment, the charging current for the capacitor can be optimally controlled and the driving state of the switching transistor can be optimized according to the charging current. Thus the current consumption can be reduced.

Still another embodiment of the present invention relates to a light emitting apparatus. This apparatus comprises: the above-described capacitor charging apparatus; and a light-emitting element driven by an output voltage appearing at the output capacitor in the capacitor charging apparatus. According to this embodiment, high voltage required for driving the light-emitting element can be generated most efficiently.

Still another embodiment of the present invention relates to an electronic apparatus. This electronic apparatus comprises:

the above-described light emitting apparatus; and a control unit which controls an emitting state of the light emitting apparatus.

3. Still another advantage of embodiments of the present invention described hereinafter is to provide a capacitor charging apparatus where the charging rate and the efficiency are balanced.

One embodiment of the present invention relates to a control circuit of a capacitor charging apparatus, the capacitor charging apparatus including a transformer and an output capacitor charged with current flowing through a secondary coil of the transformer, which charges the output capacitor by performing a switching control of a switching transistor provided on a path leading to a primary coil of the transformer. The control circuit comprises: an off-signal generator which monitors current flowing through the primary coil of the transformer and which outputs an off signal of a predetermined level when the current rises up to a predetermined peak current; a first on-signal generator which monitors voltage across the primary coil of the transformer and which outputs a first on signal of a predetermined level when the voltage across the primary coil thereof drops down to a first predetermined threshold voltage; a second on-signal generator which monitors a monitoring voltage corresponding to an output voltage appearing at the output capacitor and sets an off-time based on the monitoring voltage and which outputs a second on signal of a predetermined level after the off signal of the predetermined level has been outputted from said off-signal generator and then the off-time has elapsed; and a switching control unit which receives the off signal from the off-signal generator and receives the first and the second on signal from the first and the second on-signal generator and which turns off the switching transistor according to the off signal and turns on the switching transistor according to the first and the second on signal.

In this embodiment, the energy is stored in the transformer with the switching transistor being on. The off-signal generator determines the energy stored in the transformer, by setting a peak value of the current flowing through the primary coil of the transformer. With the switching transistor being off, the charging current flows from the secondary coil of the transformer toward the output capacitor. The energy stored in the transformer is transferred with time. When the energy has been transferred, the voltage across the primary coil attenuates with damping. When the voltage across the primary coil drops down to the first predetermined threshold voltage, the first on-signal generator detects that the energy has been completely expended, and determines the next on-timing of the switching transistor. The second on-signal generator sets a period, during which the switching transistor is to turn off, and also sets the next on-timing of the switching transistor according to the output voltage irrespective of the energy stored in the transformer.

According to this embodiment, the energy to be stored in the transformer, namely the charging rate, can be set by the off-signal generator. At the same time, the on-timing of the switching transistor is set according to the on signal outputted from either one of the first on-signal generator and the second on-signal generator, so that the selection as to whether priority is given to the efficiency or charging rate can be adjusted.

When the off signal of the predetermined level is outputted from the off-signal generator, the switching control unit may turn off the switching transistor; and the switching control unit may turn on the switching transistor according to the on signal, whichever first goes to the predetermined level, of either the first on signal outputted from the first on-signal generator or the second on signal outputted from the second on-signal generator.

The switching control unit may be configured in a manner that a mode of operation is selectable between a first mode that operates according to the first on signal and the off signal and a second mode that operates according to the second on signal and the second off signal. In such a case, the mode can be switched between a mode where the efficiency is given priority and a mode where the charging rate is given priority, according to application, a condition where the capacitor charging apparatus is used, or the like.

When the monitoring voltage is less than or equal to a second predetermined threshold voltage, the switching control unit may turn on the switching transistor according to the second on signal.

When the output voltage appearing at the output capacitor is low, the voltage across the primary coil of the transformer gets smaller, so that there is a possibility that the first on signal be generated by mistake due the effect of noise. In the light of this, the switching transistor is turned on according to the second on signal if the output voltage is low. Thereby, the switching transistor can remain off appropriately.

The second on-signal generator may set the off-time in a manner that a voltage corresponding to a voltage appearing at a tap provided in the secondary coil of the transformer is taken as the monitoring voltage. At the tap provided in the secondary coil of the transformer, there appears a voltage equal to the output voltage multiplied by a ratio corresponding to the number of turns. Hence, the off-time can be appropriately set according to the output voltage.

The switching control unit may include a flip-flop which is set by the off signal and reset by either the first on signal or the second on signal, and the switching control unit may control on and off of the switching transistor according to an output signal of the flip-flop.

The on-signal generator unit may set the off-time in such a manner that the larger the monitoring voltage is, the shorter the off-time becomes. In this case, when the output voltage immediately after a start of charging is low, the energy stored in the transformer can be used efficiently. And as the output voltage gets higher, the charging rate can be raised. Thus, the efficiency and the charging rate can be balanced.

A control circuit according to an embodiment may be integrated on a single semiconductor substrate. "Being integrated" includes a case where all of circuit components are formed on a semiconductor substrate and a case where the main components of a circuit are integrated thereon. Note that part of resistors or capacitors used to adjust circuit constants may be provided outside the semiconductor substrate. Integrating the control circuit into a single LSI can reduce the circuit area.

Another embodiment of the present invention relates to a capacitor charging apparatus. This capacitor charging apparatus comprises: a transformer, including a primary coil and a secondary coil, wherein an input voltage is applied to one end of the primary coil and a switching transistor is connected to other end thereof; an output capacitor one end of which is grounded; a diode having an anode thereof connected to a secondary coil side of the transformer and a cathode thereof connected to the other-end side of the output capacitor; and a control circuit, according to any one of the above-described embodiments, which controls on and off of the switching transistor.

Still another embodiment of the present invention relates also to a capacitor charging apparatus. This capacitor charging apparatus comprises: a transformer, including a primary coil and a secondary coil, wherein one end of the primary coil is connected in common with one end of the secondary coil and an input voltage is applied to a common connection point thereof; a switching transistor connected to the other-end side of the primary coil; a diode having an anode thereof connected to other end of the secondary coil; an output capacitor provided between a cathode of the diode and ground; and a control circuit which controls on and off of the switching transistor.

According to this capacitor charging apparatus, the transformer is configured to have three terminals, so that the circuit area can be reduced.

In an embodiment, a tap may be provided in the secondary coil of the transformer. The control circuit may perform at least part of on-off control of the switching transistor, based on a voltage corresponding to a voltage appearing at the tap.

At the tap provided in the secondary coil of the transformer, there appears a voltage equal to the output voltage multiplied by a ratio corresponding to the number of turns. Hence, the switching control according to the output voltage can be realized.

The control circuit may detect completion of charging of the output capacitor by comparing the voltage corresponding to a voltage appearing at the tap with a predetermined threshold voltage. In so doing, the predetermined threshold voltage may be varied according to the input voltage.

The voltage appearing at the tap varies according to the input voltage. According to this embodiment, such a variation can be corrected.

The control circuit may include: a difference voltage generation circuit which generates a voltage corresponding to a difference voltage between the voltage appearing at the tap and a voltage obtained by multiplying the input voltage by a predetermined constant; and a comparator which compares an output voltage of the difference voltage generation circuit with a predetermined threshold voltage. Completion of charging may be detected by the control circuit when the output voltage of the difference voltage generation circuit exceeds the predetermined threshold voltage.

According to this embodiment, even if the input voltage varies, the output voltage of the capacitor charging apparatus at the time of completion of charging thereof can be kept at a constant value.

The control circuit may include: an off-signal generator which monitors current flowing through the primary coil of the transformer and which outputs an off signal of a predetermined level when the current rises up to a predetermined peak current; a first on-signal generator which monitors voltage across the primary coil of the transformer and which outputs a first on signal of a predetermined level when the voltage across the primary coil thereof drops down to a first predetermined threshold voltage; a second on-signal generator which monitors a monitoring voltage corresponding to an output voltage appearing at the output capacitor and sets an off-time based on the monitoring voltage and which outputs a second on signal of a predetermined level after the off signal of the predetermined level has been outputted from the off-signal generator and then the off-time has elapsed; and a switching control unit which receives the off signal from the off-signal generator and receives the first and the second on signal from the first and the second on-signal generator and which turns off the switching transistor according to the off signal and turns on the switching transistor according to the first and the second on signal.

A tap may be provided on the secondary coil of the transformer, and the second on-signal generator may monitor a voltage corresponding to a voltage appearing at the tap, as the monitoring voltage.

Still another embodiment of the present invention relates to a transformer. This transformer includes a primary coil and a secondary coil, wherein one end of the primary coil is connected in common with one end of the secondary coil and a terminal is provided for a common connection point thereof, and terminals are further provided for the primary coil and the secondary coil, respectively. According to this embodiment, the transformer can be configured by three terminals instead of the conventional four terminals, thereby realizing a smaller circuitry.

Still another embodiment of the present invention relates to a light emitting apparatus. This apparatus comprises: a capacitor charging apparatus according to any one of the above-described embodiments; and a light-emitting element driven by an output voltage appearing at the output capacitor in the capacitor charging apparatus.

Still another embodiment according to the present invention relates to an electronic apparatus. This electronic apparatus comprises: the above-described light emitting apparatus according; and a control unit which controls an emitting state of the light emitting apparatus.

Still another embodiment of the present invention relates to a method for controlling a capacitor charging apparatus, including a transformer and an output capacitor charged with current flowing through a secondary coil of the transformer, which charges the output capacitor by performing a switching control of a switching transistor provided on a path leading to a primary coil of the transformer. This control method comprising: an off-signal generating step of monitoring current flowing through the primary coil of the transformer and generating an off signal of a predetermined level when the current rises up to a predetermined peak current; a first on-signal generating step of monitoring voltage across the primary coil of the transformer and generating a first on signal of a predetermined level when the voltage across the primary coil thereof drops down to a predetermined threshold voltage; a second on-signal generating step of monitoring a monitoring voltage corresponding to an output voltage appearing at the output capacitor, setting an off-time based on the monitoring voltage and generating a second on signal of a predetermined level after the off signal of the predetermined level has been outputted and then the off-time has elapsed; and a switching step of turning off the switching transistor according to the off signal and turning on the switching transistor according to the first and the second on signal.

According to this embodiment, the selection as to whether priority is given to the efficiency or the charging rate can be controlled.

When the off signal of the predetermined level is outputted, the switching step may turn off the switching transistor, and the switching step may turn on the switching transistor according to the on signal, whichever first goes to the predetermined level, of either the first on signal or the second on signal.

It is to be noted that any arbitrary combination or rearrangement of the above-described structural components and so forth are effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described based on preferred embodiments which do not intend to limit the scope of the present invention but exemplify the invention. All of the features and the combinations thereof described in the embodiments are not necessarily essential to the invention.

First Embodiment

Figure 1:
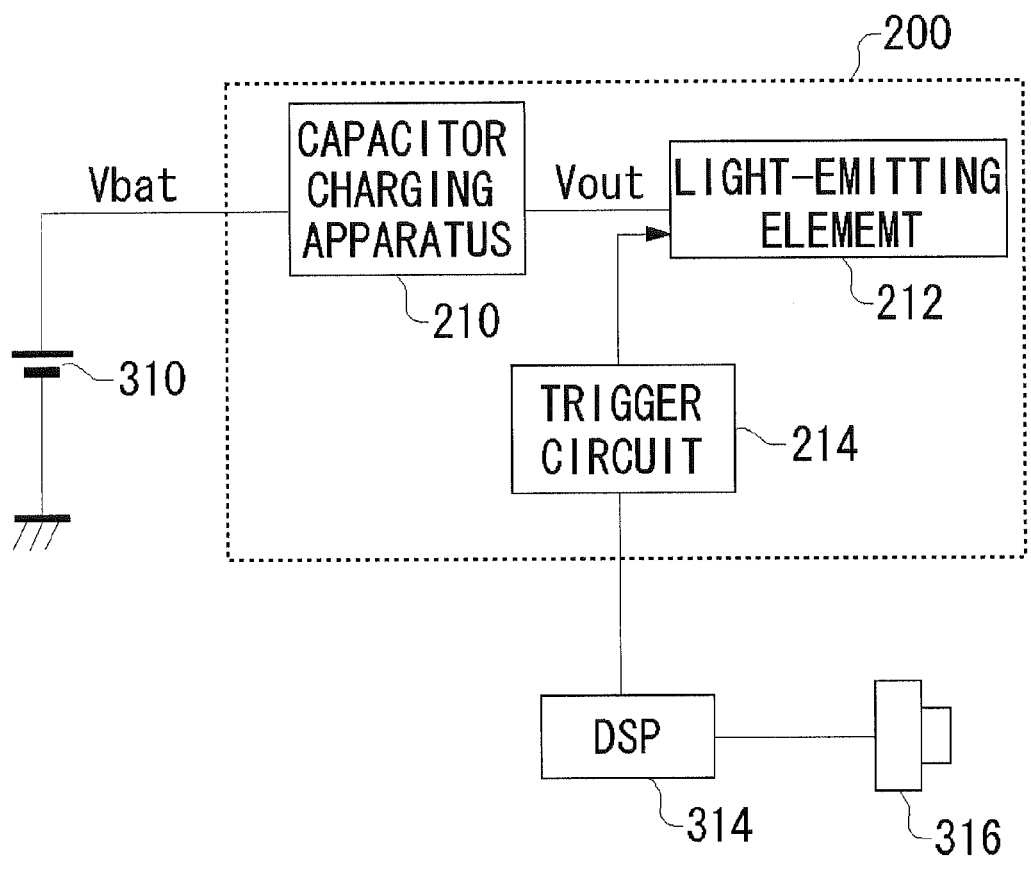
FIG. 1 is a block diagram showing a structure of an electronic apparatus having a light emitting apparatus according to one embodiment of the present invention.

FIG. 1 is a block diagram showing a structure of an electronic apparatus 300 provided with a light emitting apparatus 200 according to a first embodiment of the present invention. The electronic apparatus 300, which is a digital still camera, a digital video camera or a mobile phone terminal provided with an image pickup function, includes a battery 310, a DSP (Digital Signal Processor) 314, an image pickup unit 316, and a light emitting apparatus 200.

The battery 310, which is, for instance, a lithium ion battery, outputs a voltage of about 3 to 4 V as a battery voltage Vbat. The DSP 314, which is a block for performing an overall control of the electronic apparatus 300, is connected to the image pickup unit 316 and the light emitting apparatus 200. The image pickup unit 316 is an image-taking device such as a CCD (Charge-Coupled Device) or a CMOS sensor. The light emitting apparatus 200 is a light source that is used as a flash at the time of image pickup by the image pickup unit 316.

The light emitting apparatus 200 includes a capacitor charging apparatus 210, a light-emitting element 212, and a trigger circuit 214. A xenon tube, for instance, is suitably used as the light-emitting element 212. The capacitor charging apparatus 210 boosts a battery voltage Vbat supplied from the battery 310 by charging an output capacitor provided at the output thereof and supplies a drive voltage of about 300 V to the light-emitting element 212. The trigger circuit 214 is a circuit that controls the light emission timing of the light emitting apparatus 200. The light-emitting element 212 emits light synchronously with the image pickup by the image pickup unit 316.

Figure 2:
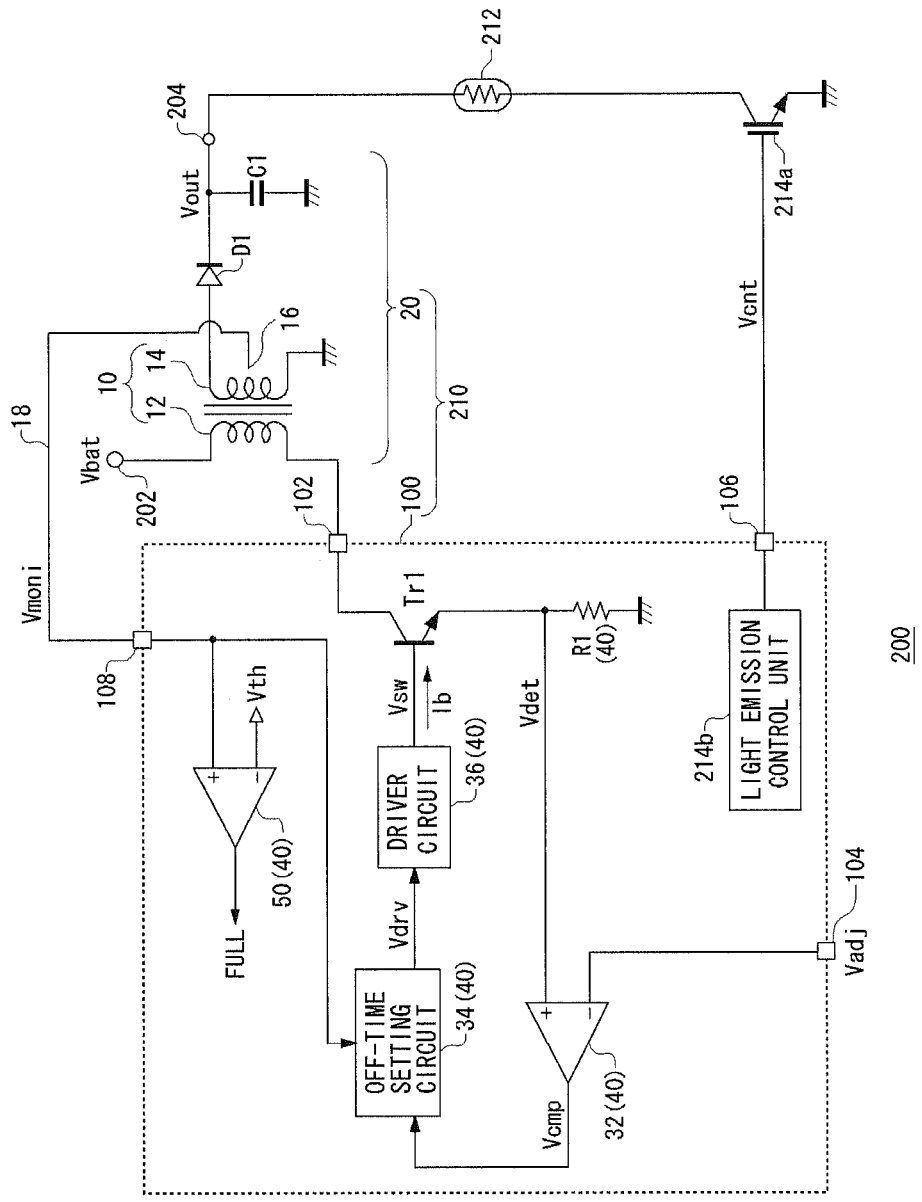
FIG. 2 is a circuit diagram showing a structure of a light emitting apparatus according to a first embodiment of the present invention.

FIG. 2 is a circuit diagram showing a structure of a light emitting apparatus 200 of FIG. 1. The light emitting apparatus 200 includes a capacitor charging apparatus 210, a light-emitting element 212 and an IGBT 214a. A control circuit 100, a switching transistor Tr1, a transformer 10, a rectifier diode D1 and an output capacitor C1 shown in FIG. 2 correspond to the capacitor charging apparatus 210 shown in FIG. 1. The trigger circuit 214 shown in FIG. 1 corresponds to the IGBT 214a and the light emission control unit 214b of FIG. 2.

The capacitor charging apparatus 210 generates a drive voltage (hereinafter referred to also as output voltage Vout) necessary for the light emission by the light-emitting element 212 by supplying a charging current to the output capacitor C1. The capacitor charging apparatus 210 is structured by including an output circuit 20 and a control circuit 100.

The output circuit 20 includes a transformer 10, a rectifier diode D1, and an output capacitor C1. The transformer 10 is provided with a primary coil 12 and a secondary coil 14. One end of the primary coil 12 is the input terminal 202 of the capacitor charging apparatus 210, where a battery voltage Vbat outputted from the battery 310 of FIG. 1 is applied. The other end of the primary coil 12 is connected to the switching terminal 102 of the control circuit 100.

One end of the secondary coil 14 of the transformer 10 is grounded to fix the potential, whereas the other end thereof is connected to an anode of the rectifier diode D1. One end of the output capacitor C1 is grounded, and the other end thereof is connected to a cathode of the rectifier diode D1. A terminal of the output capacitor C1 serves as the output terminal 204 of the capacitor charging apparatus 210 and thus outputs the voltage charged in the output capacitor C1 as an output voltage Vout.

According to the first embodiment, the secondary coil 14 of the transformer 10 is provided with a tap 16 (F winding). The voltage of the tap 16 (hereinafter referred to as monitoring voltage Vmoni) is inputted to a voltage monitoring terminal 108 of the control circuit 100 via a wiring 18. The control circuit 100 controls the on and off of the switching transistor Tr1 by regarding the monitoring voltage Vmoni as the output voltage Vout of the light emitting apparatus 200. The voltage monitoring terminal 108 and the wiring 18 leading to the tap 16 function as a voltage detector that monitors the voltage of the tap 16.

The control circuit 100 stores energy in the transformer 10, generates a charging current for the output capacitor C1, and boosts the voltage of the battery voltage Vbat by performing a switching control of the on and off of the switching transistor Tr1. Hereinbelow, the current flowing through the primary coil 12 is called a primary current Ic1, and that flowing through the secondary coil 14 a secondary current Ic2.

The control circuit 100 includes a detection resistor R1, a comparator 32, an off-time setting circuit 34, a driver circuit 36, a light emission control unit 214b, and a charging completion detecting circuit 50, in addition to the switching transistor Tr1. The control circuit 100 is integrated onto a single semiconductor substrate as a function IC.

The control circuit 100 controls the on and off of the switching transistor Tr1 by controlling the voltage or current that is applied to the control terminal thereof. In this first embodiment, the switching transistor Tr1 is a bipolar transistor. The collector of the switching transistor Tr1 is coupled to the primary coil 12 of the transformer 10 via a switching terminal 102. The driver circuit 36 performs a switching control of the base current Ib of the switching transistor Tr1.

The detection resistor R1, the comparator 32, the off-time setting circuit 34, the driver circuit 36, and a charging completion detecting circuit 50, in combination, function as a switching control unit for controlling the switching operation of the switching transistor Tr1. This switching control unit controls the on and off of the switching transistor Tr1 by regarding the monitoring voltage Vmoni as the output voltage Vout of the capacitor charging apparatus 210.

The detection resistor R1 functions as a primary current detection circuit that detects the primary current Ic1 flowing through the primary coil 12 of the transformer 10. The detection resistor R1 is provided on the same path as the primary coil 12 where the primary current Ic1 flows and the switching transistor Tr1 are, and one end thereof is grounded and the other end thereof is connected to the emitter of the switching transistor Tr1. Across the detection resistor R1 occurs a voltage drop (Vdet=Ic1×R1) in proportion to the primary current Ic1. The detection resistor R1 outputs a detection voltage Vdet according to the primary current Ic1.

To a charging current control terminal 104 of the control circuit 100, a current adjusting signal Vadj, which is used to specify the charging current for the output capacitor C1, is inputted from outside. The comparator 32 compares the detection voltage Vdet outputted from the primary current detection circuit against the current adjusting signal Vadj. The comparator 32 outputs a high-level signal when it detects that the detection voltage Vdet has exceeded the current adjusting signal Vadj, that is, the primary current Ic1 has reached a predetermined current value determined according to the current adjusting signal Vadj (hereinafter referred to as a peak current value Ipeak). A comparison signal Vcmp outputted from the comparator 32 is inputted to the off-time setting circuit 34. As will be described later, the current adjusting signal Vadj is a signal that defines the peak value Ipeak of a charging current. The relationship between the peak current value Ipeak and the current adjusting signal Vadj is expressed as Ipeak=Vadj/R1.

The off-time setting circuit 34 counts a certain off-time Toff from the point when a comparison signal Vcmp goes high and generates a drive signal Vdrv of a first level (e.g., low level) for a period until this off-time Toff elapses.

While the drive signal Vdrv is at the first level, i.e., while the off-time Toff is being counted by the off-time setting circuit 34, the driver circuit 36 stops the supply of base current to the switching transistor Tr1, thereby turning off the switching transistor Tr1. As the drive signal Vdrv returns to a second level (e.g., high level) after the lapse of the off-time Toff, the driver circuit 36 supplies base current to the switching transistor Tr1, thereby turning it on again.

The switching control unit 40 outputs to the base of the switching transistor Tr1 a switching signal Vsw for specifying "on" to the switching transistor Tr1 until the primary current Ic1 reaches a predefined peak current value Ipeak, and then specifying "off" to the switching transistor Tr1 for a period of a certain off-time.

Note that the off-time Toff may be a predetermined duration of time, may be set according to the output voltage Vout, may be set according to the condition of the primary side or the secondary side of the transformer 10, or may be set according to the monitoring voltage Vmoni as will be explained later.

Inputted to the driver circuit 36 in the switching control unit 40 is the current adjusting signal Vadj that specifies the charging current. In response to the current adjusting signal Vadj, the driver circuit 36 adjusts the switching signal to be outputted to the base of the switching transistor Tr1. More specifically, the switching control unit 40 adjusts the current value of the base current Ib to be outputted as a switching signal to the base of the switching transistor Tr1, according to the current adjusting signal Vadj.

The charging completion detecting circuit 50, which is a comparator, detects the completion of a charging by regarding the monitoring voltage Vmoni appearing at the tap 16 provided on the secondary coil 14 of the transformer 10 as the output voltage Vout appearing at the output capacitor C1 and comparing it against a predetermined threshold voltage Vth. The threshold voltage Vth is set to a voltage sufficient for light emission by the light-emitting element 212, for example, about 300 V. Upon detecting the completion of charging, the charging completion detecting circuit 50 sets a flag FULL to indicate the completion of charging. Now with the completion of charging detected by the charging completion detecting circuit 50, the switching control unit 40 stops the switching of the switching transistor Tr1.

Further, according to the first embodiment, the monitoring voltage Vmoni inputted to the voltage monitoring terminal 108 is inputted to the off-time setting circuit 34 in the switching control unit 40. The off-time setting circuit 34 operates in a manner such that the off-time Toff, during which the switching transistor Tr1 is turned off, changes according to the monitoring voltage Vmoni.

For example, the off-time setting circuit 34 may set the off-time Toff in such a manner that the higher the monitoring voltage Vmoni is, that is, the higher the output voltage Vout is, the shorter the off-time Toff may be. If the off-time setting circuit 34 is to be structured by a CR time constant circuit capable of charging and discharging the capacitor, then the off-time Toff can be adjusted by changing the charging current or the discharging current according to the monitoring voltage Vmoni.

The light emission control unit 214b generates a light emission control signal Vcnt and controls the base voltage of the IGBT 214a. When the light emission control signal Vcnt goes to a high level with a charging of the output capacitor C1 completed and sufficient drive voltage Vout generated, the IGBT 214a turns on and the light-emitting element 212 emits light.

Figure 3:
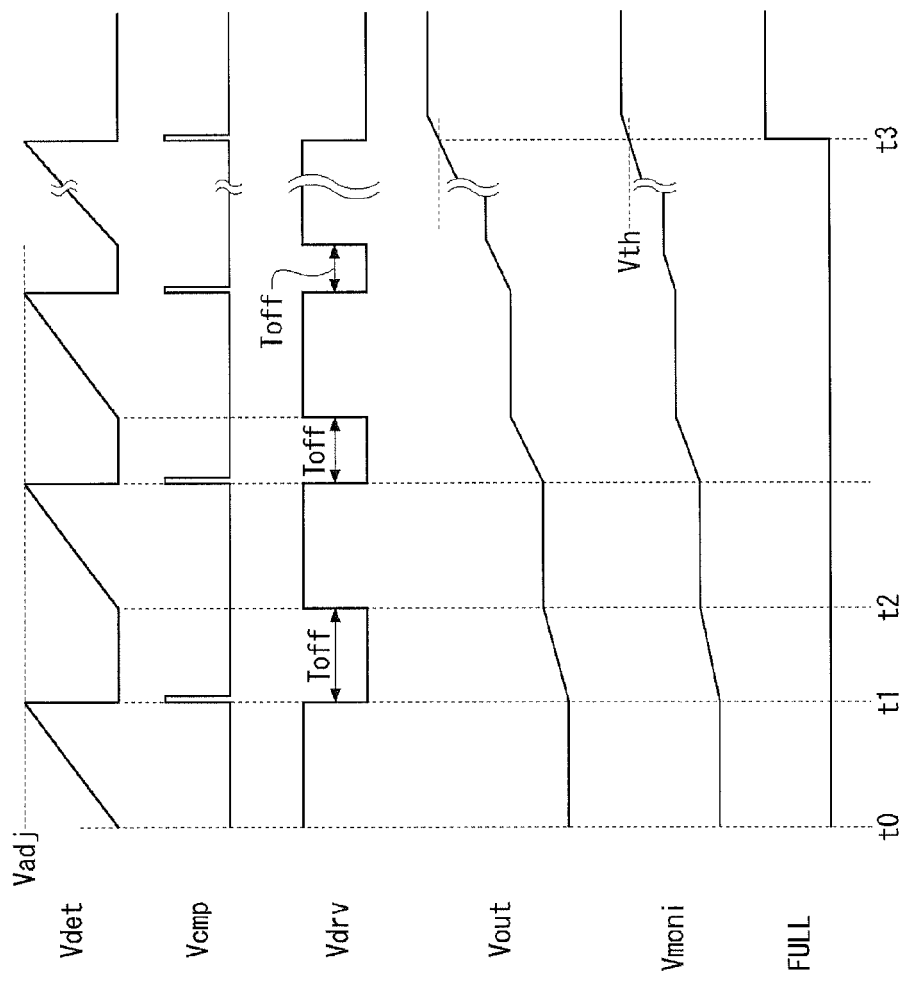
FIG. 3 is a timing chart showing an operation of a capacitor charging apparatus of FIG. 2.

Now a description will be given of an operation of a light emitting apparatus 200 configured as described above. FIG. 3 is a timing chart showing an operation of a capacitor charging apparatus 210 according to the first embodiment. Note that the vertical axis and the horizontal axis of FIG. 3 are enlarged or reduced as appropriate for ease of understanding and also that the waveforms shown are simplified for easier understanding. At time t0, a switching signal Vsw goes to a high level, that is, the switching transistor Tr1 turns on with a base current Ib supplied thereto. With the switching transistor Tr1 turned on, a primary current Tel flowing through the primary coil of the transformer 10 increases gradually until time t1 when Vdet>Vadj.

With Vdet>Vadj, a comparison signal Vcmp, which is outputted from the comparator 32, switches from low level to high level. The off-time setting circuit 34 sets the drive signal Vdrv to a first level (low level) for an off-time Toff after the comparison signal Vcmp has reached a high level. For the duration when the drive signal Vdrv is at a low level, the driver circuit 36 turns off the switching transistor Tr1 by stopping the supply of base current Ib thereto. With the switching transistor Tr1 turned off, the output capacitor C1 is charged with a secondary current Ic2 flowing through the secondary coil 14 of the transformer 10.

At time t2, after the passage of an off-time Toff from time t1, the drive signal Vdrv switches to a high level. Now, with the drive signal Vdrv at high level, the driver circuit 36 supplies base current Ib to the switching transistor Tr1. By repeating the cycle of operation from time t0 to time t2, the control circuit 100 charges the output capacitor C1 and raises the output voltage Vout.

If it is so arranged that the off-time Toff to be set by the off-time setting circuit 34 is dependent on the monitoring voltage Vmoni, then the off-time Toff will grow shorter gradually with the rise in the monitoring voltage Vmoni, namely, the rise in the output voltage Vout. Consequently, when the output voltage Vout is low immediately after the start of charging, the energy stored in the transformer is used efficiently, and as the output voltage Vout goes higher, the charging rate can be accelerated. Thus, it is possible to balance the efficiency and the charging rate.

At time t3, when the monitoring voltage Vmoni reaches the threshold voltage Vth, a flag FULL indicating the completion of a charging is set by the charging completion detecting circuit 50, which enables a light emission by the light-emitting element 212. When the monitoring voltage Vmoni rises to a desired voltage level, the light emission control unit 214b switches the light emission control signal Vent to a high level in synchronism with an image pickup by the image pickup unit 316 as shown in FIG. 1. As a result, the IGBT 214a turns on, and the xenon lamp, which is the light-emitting element 212, emits light as a flash.

With the capacitor charging apparatus 210 according to the first embodiment, it is possible to detect with accuracy the voltage relative to the output voltage Vout appearing at the output capacitor C1 by monitoring the potential at a tap (F winding) provided on the secondary coil 14 of the transformer 10. Also, location of the tap 16 on the grounding side, namely the lower-voltage side, of the secondary coil 14 makes it unnecessary to use resistance voltage division, thus avoiding any increase in the number of circuit components used. The control circuit 100 can optimally perform switching control of the switching transistor Tr1 using the monitoring voltage Vmoni corresponding to the output voltage Vout.

For example, according to the first embodiment, the charging completion detecting circuit 50 carries out the detection of a charging state based on the monitoring voltage Vmoni. Compared with the direct monitoring of the output voltage Vout appearing at the output capacitor C1, this arrangement makes it possible to stop the switching by detecting a full charging state with high accuracy. This will also solve the problems of inability to obtain the voltage required to drive the load or overcharging of the output capacitor C1.

Also, according to the first embodiment, the off-time setting circuit 34 sets the off-time Toff based on the monitoring voltage Vmoni. As a result, the output voltage can be reflected in the switching operation with accuracy.

The above embodiment is merely exemplary and it is understood by those skilled in the art that various modifications to the combination of each component and process thereof are possible and such modifications are also within the scope of the present invention.

In the present embodiment, a description has been given of a case where a bipolar transistor is used as the switching transistor Tr1. However, a MOSFET may be used instead. Also, in the present embodiment, a description has been given of a case where the timing of on and off of the switching transistor Tr1 is determined based on the primary current Ic1. However, the control method is not limited thereto, and other control methods may be employed.

Further, in the present embodiment, a description has been given of a case where a capacitor charging apparatus 210 drives a light-emitting element 212. However, the application is not limited thereto, and the capacitor charging apparatus 210 may also be used to drive a variety of other load circuits that require high voltage.

Also, the setting of logical values of high level and low level described in the present embodiment is only one example. The setting can be changed freely by inverting them as appropriate by an inverter or the like.

Second Embodiment

Figure 4:
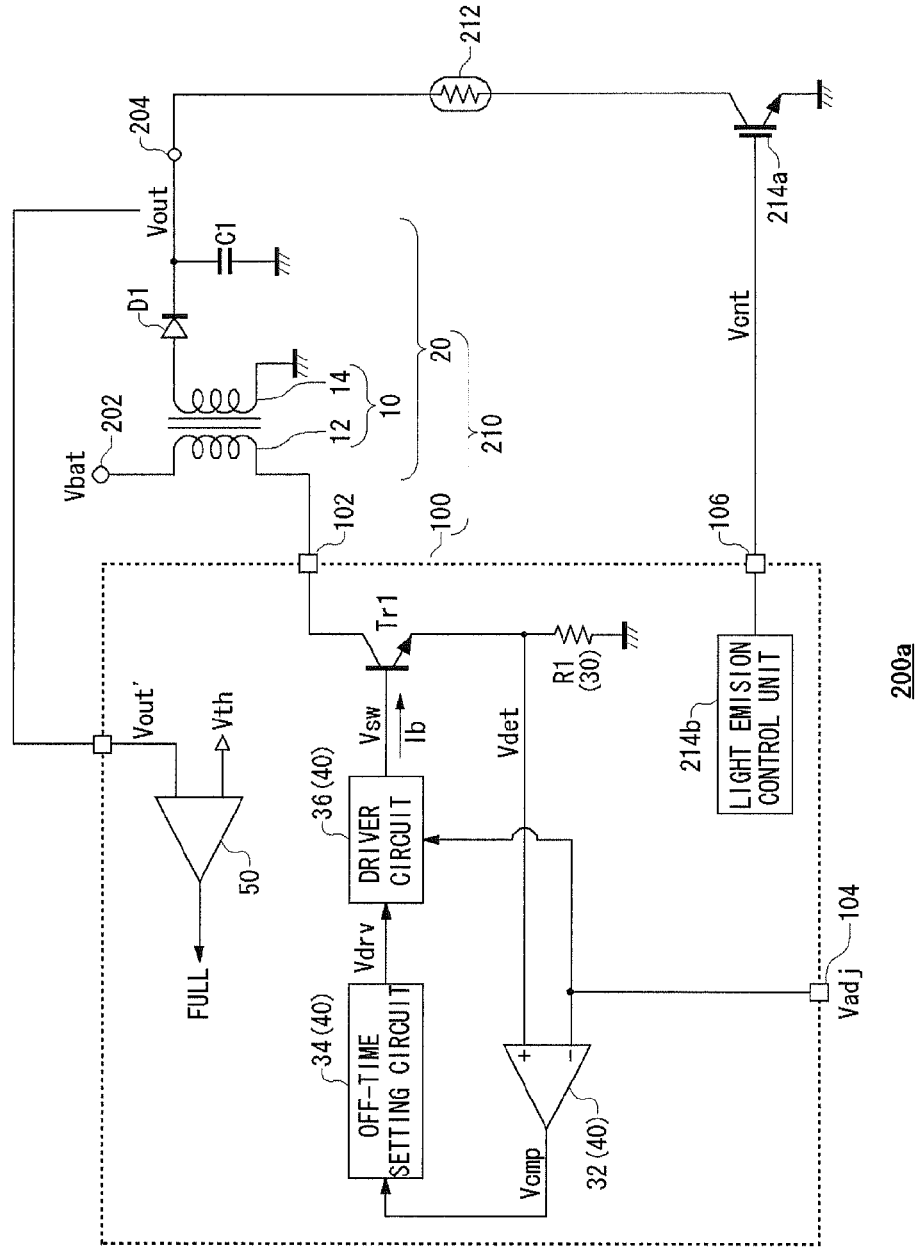
FIG. 4 is a circuit diagram showing a structure of a light emitting apparatus according to a second embodiment of the present invention.

FIG. 4 is a circuit diagram showing a structure of a light emitting apparatus 200a according to a second embodiment of the present invention. Similar to the light emitting apparatus 200 according to the first embodiment, the light emitting apparatus 200a as shown in FIG. 4 is suitably used for the electronic apparatus as shown FIG. 1.

The electronic apparatus 300 of FIG. 1, which is a digital still camera, a digital video camera or a mobile phone terminal provided with an image pickup function, includes a battery 310, a DSP (Digital Signal Processor) 314, an image pickup unit 316, and a light emitting apparatus 200a.

The battery 310, which is, for instance, a lithium ion battery, outputs a voltage of about 3 to 4 V as a battery voltage Vbat. The DSP 314, which is a block for performing an overall control of the electronic apparatus 300, is connected to the image pickup unit 316 and the light emitting apparatus 200a. The image pickup unit 316 is an image-taking device such as a CCD (Charge-Coupled Device) or a CMOS sensor. The light emitting apparatus 200a is a light source that is used as a flash at the time of image pickup by the image pickup unit 316.

The light emitting apparatus 200a includes a capacitor charging apparatus 210, a light-emitting element 212, and a trigger circuit 214. A xenon tube or the like is suitably used as the light-emitting element 212. The capacitor charging apparatus 210 boosts a battery voltage Vbat supplied from the battery 310 by charging an output capacitor provided at the output thereof and supplies a drive voltage of about 300 V to the light-emitting element 212. The trigger circuit 214 is a circuit that controls the light emission timing of the light emitting apparatus 200a. The light-emitting element 212 emits light synchronously with the image pickup by the image pickup unit 316.

Referring back to FIG. 4, a structure of the light emitting apparatus 200a will now be described. The light emitting apparatus 200a includes a capacitor charging apparatus 210, a light-emitting element 212, and an IGBT 214a. A control circuit 100, a switching transistor Tr1, a transformer 10, a rectifier diode D1 and an output capacitor C1 shown in FIG. 4 correspond to the capacitor charging apparatus 210 shown in FIG. 1. The trigger circuit 214 shown in FIG. 1 corresponds to the IGBT 214a and the light emission control unit 214b of FIG. 4.

The capacitor charging apparatus 210 generates a drive voltage (hereinafter referred to also as output voltage Vout) necessary for the light emission by the light-emitting element 212 by supplying a charging current to the output capacitor C1. The capacitor charging apparatus 210 is structured by including an output circuit 20 and a control circuit 100.

The output circuit 20 includes a transformer 10, a rectifier diode D1, and an output capacitor C1. The transformer 10 is provided with a primary coil 12 and a secondary coil 14. One end of the primary coil 12 is the input terminal 202 of the capacitor charging apparatus 210, where the battery voltage Vbat outputted from the battery 310 of FIG. 1 is applied. The other end of the primary coil 12 is connected to the switching terminal 102 of the control circuit 100.

One end of the secondary coil 14 of the transformer 10 is grounded to fix the potential, whereas the other end thereof is connected to an anode of the rectifier diode D1. One end of the output capacitor C1 is grounded, and the other end thereof is connected to a cathode of the rectifier diode D1. A terminal of the output capacitor C1 serves as the output terminal 204 of the capacitor charging apparatus 210 and thus outputs the voltage charged in the output capacitor C1 as an output voltage Vout.

The control circuit 100 stores energy in the transformer 10, generates a charging current for the output capacitor C1, and boosts the voltage of the battery voltage Vbat by performing a switching control of the on and off of the switching transistor Tr1. Hereinbelow, the current flowing through the primary coil 12 is called a primary current Ic1, and that flowing through the secondary coil 14 a secondary current Ic2.

The control circuit 100 includes a detection resistor R1, a comparator 32, an off-time setting circuit 34, a driver circuit 36 and a light emission control unit 214b, in addition to the switching transistor Tr1. The control circuit 100 is integrated onto a single semiconductor substrate as a function IC.

The control circuit 100 controls the on and off of the switching transistor Tr1 by controlling the voltage or current that is applied to the control terminal thereof. In this second embodiment, the switching transistor Tr1 is a bipolar transistor. The collector of the switching transistor Tr1 is coupled to the primary coil 12 of the transformer 10 via the switching terminal 102. The driver circuit 36 performs a switching control of the base current Ib of the switching transistor Tr1.

The detection resistor R1 functions as a primary current detection circuit 30 that detects the primary current Ic1 flowing through the primary coil 12 of the transformer 10. The detection resistor R1 is provided on the same path as the primary coil 12 where the primary current Ic1 flows and the switching transistor Tr1 are, and one end thereof is grounded and the other end thereof is connected to the emitter of the switching transistor Tr1. Across the detection resistor R1 occurs a voltage drop (Vdet=Ic1×R1) in proportion to the primary current Ic1. The detection resistor R1 outputs a detection voltage Vdet according to the primary current Ic1.

To a charging current control terminal 104 of the control circuit 100, a current adjusting signal Vadj, which is used to specify the charging current for the output capacitor C1, is inputted from outside. The comparator 32 compares the detection voltage Vdet outputted from the primary current detection circuit 30 against the current adjusting signal Vadj. The comparator 32 outputs a high-level signal when it detects that the detection voltage Vdet has exceeded the current adjusting signal Vadj, that is, the primary current Ic1 has reached a predetermined peak current value determined according to the current adjusting signal Vadj (hereinafter referred to as a peak current value Ipeak). A comparison signal Vcmp outputted from the comparator 32 is inputted to the off-time setting circuit 34. As will be described later, the current adjusting signal Vadj is a signal that defines the peak value Ipeak of a charging current. The relationship between the peak current value Ipeak and the current adjusting signal Vadj is expressed as Ipeak=Vadj/R1.

The off-time setting circuit 34 generates a derive signal Vdrv of a first level (e.g., low level) for a period when a comparison signal Vcmp goes high until a certain off-time Toff elapses. While the drive signal Vdrv is in the first level, the driver circuit 36 stops the supply of base current to the switching transistor Tr1 and thereby turns off the switching transistor Tr1. As the drive signal Vdrv returns to a second level (e.g., high level) after the lapse of the off-time Toff, the driver circuit 36 supplies base current to the switching transistor Tr1 and turns it on again.

That is, according to the second embodiment, the comparator 32, the off-time setting circuit 34 and the driver circuit 36 monitor at least the primary current Tel detected by the primary current detection circuit 30 and function as a switching control unit 40 that controls the on and off of the switching transistor Tr1. This switching control unit 40 outputs to the base of the switching transistor Tr1 a switching signal Vsw specifying "on" to the switching transistor for a period until the primary current Tel has reached a predetermined peak current value Ipeak and then specifying "off" to the switching transistor Tr1 for a period of a certain off-time.

Note that the off-time Toff may be a predetermined duration of time, may be set according to the output voltage Vout, or may be set according to the condition of the primary side or the secondary side of the transformer 10.

Inputted to the driver circuit 36 in the switching control unit 40 is the current adjusting signal Vadj that specifies the charging current. In response to the current adjusting signal Vadj, the driver circuit 36 adjusts the switching signal to be outputted to the base of the switching transistor Tr1. More specifically, the switching control unit 40 adjusts the current value of the base current Ib to be outputted as a switching signal to the base of the switching transistor Tr1, according to the current adjusting signal Vadj.

Figure 5:
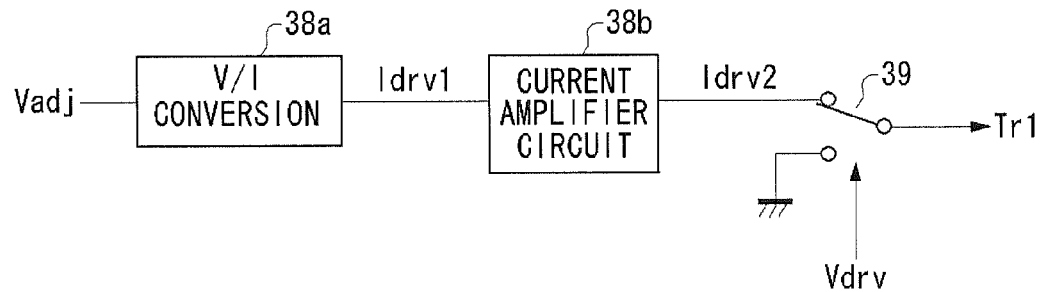
FIG. 5 is a circuit diagram showing a structure of a driver circuit of FIG. 4.

FIG. 5 is a circuit diagram showing a structure of the driver circuit 36 of FIG. 4. The driver circuit 36 includes a current generation unit 38. The current generation unit 38 includes, for example, a VI conversion circuit 38a and a current amplifier circuit 38b. The VI conversion circuit 38a receives a current adjusting signal Vadj and generates a current Idrv1 according to the voltage value of the current adjusting signal Vadj. The VI conversion circuit 38a generates the drive current Idrv in such a manner that the larger the current adjusting signal Vadj is, the larger the drive current Idrv1 is. Preferably, the drive current Idrv1 may be proportional to the current adjusting signal Vadj.

The current Idrv1 is amplified by the current amplifier circuit 38b configured by a current mirror circuit and the like. For a period when the drive signal Vdrv outputted from the off-time setting circuit 34 is in a second level, the switch circuit 39 outputs the drive current Idrv2 as the drive current Ib of the switching transistor Tr1, whereas for a period when the derive signal Vdrv is in a first level, it stops the output of the drive current Idrv2.

Refer back to FIG. 4. The charging completion detecting circuit 50 monitors either directly or indirectly the output voltage Vout appearing at the output capacitor C1. "Directly monitoring" includes a case where the potential of the output terminal 204 is subjected to the resistance voltage division.

"Indirectly monitoring" includes a case where the voltage applied to the primary coil 12 or the secondary coil 14 of the transformer 10 is monitored.

The charging completion detecting circuit 50, which is a comparator, detects the completion of a charging by comparing an output voltage Vout' corresponding to the output voltage Vout against a predetermined threshold voltage Vth. The threshold voltage Vth is set to a voltage sufficient for light emission by the light-emitting element 212, for example, about 300 V. Upon detecting the completion of charging, the charging completion detecting circuit 50 sets a flag FULL to indicate the completion of charging. Now with the completion of charging detected by the charging completion detecting circuit 50, the switching control unit 40 stops the switching of the switching transistor Tr1.

The light emission control unit 214b generates a light emission control signal Vcnt and controls the base voltage of the IGBT 214a. When the light emission control signal Vcnt goes to a high level with a charging of the output capacitor C1 completed and sufficient drive voltage Vout generated, the IGBT 214a turns on and the light-emitting element 212 emits light.

Figure 6:
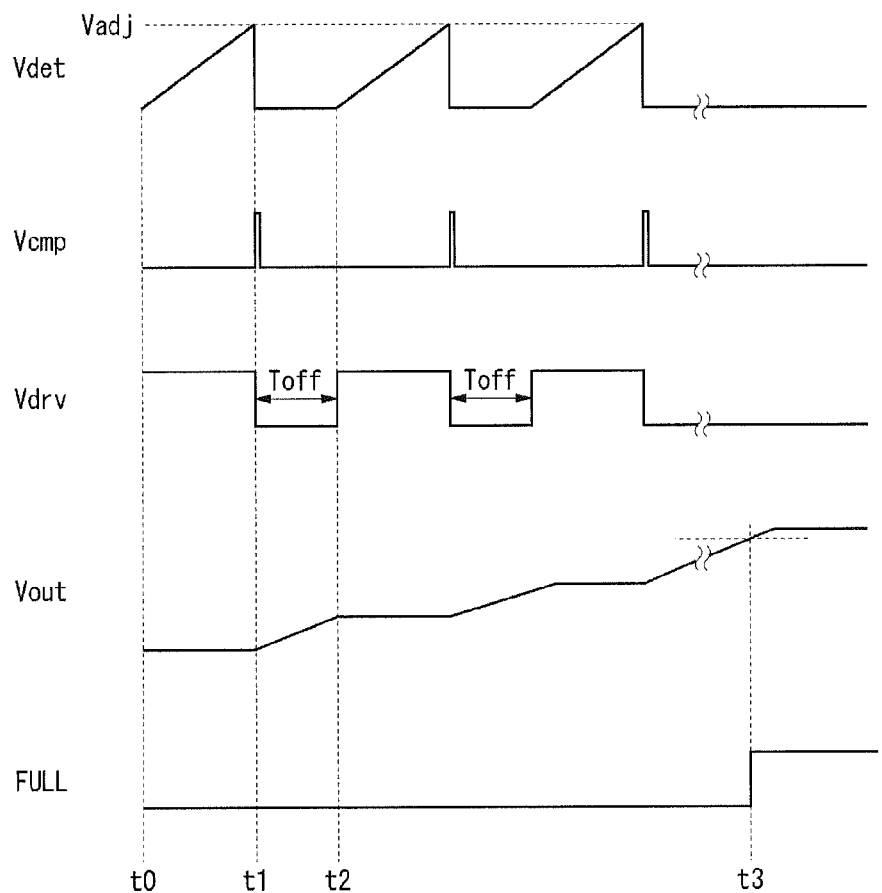
FIG. 6 is a timing chart showing an operation of a capacitor charging apparatus of FIG. 4.

Now a description will be given of an operation of a light emitting apparatus 200a configured as described above. FIG. 6 is a timing chart showing an operation of a capacitor charging apparatus 210 according to the second embodiment. Note that the vertical axis and the horizontal axis of FIG. 6 are enlarged or reduced as appropriate for ease of understanding and also that the waveforms shown are simplified for easier understanding.

At time t0, a switching signal Vsw goes to a high level, that is, the switching transistor Tr1 turns on with a base current Ib supplied thereto. With the switching transistor Tr1 turned on, a primary current Ic1 flowing through the primary coil of the transformer 10 increases gradually until time t1 when Vdet>Vadj.

With Vdet>Vadj, a comparison signal Vcmp, which is outputted from the comparator 32, switches from low level to high level. The off-time setting circuit 34 sets the drive signal Vdrv to a first level (low level) for an off-time Toff after the comparison signal Vcmp has become a high level. For the duration when the drive signal Vdrv is at a low level, the driver circuit 36 turns off the switching transistor Tr1 by stopping the supply of base current Ib thereto. With the switching transistor Tr1 turned off, the output capacitor C1 is charged with a secondary current Ic2 flowing through the secondary coil 14 of the transformer 10.

At time t2, after the passage of an off-time Toff from time t1, the drive signal Vdrv switches to a high level. Now, with the drive signal Vdrv at high level, the driver circuit 36 supplies base current Ib to the switching transistor Tr1. By repeating the cycle of operation from time t0 to time t2, the control circuit 100 charges the output capacitor C1 and raises the output voltage Vout.

At time t3, when the output voltage Vout reaches the threshold voltage Vth, a flag FULL indicating the completion of a charging is set, thereby enabling a light emission by the light-emitting element 212. When the output voltage Vout rises to a desired voltage level, the light emission control unit 214b switches the light emission control signal Vcnt to a high level in synchronism with an image pickup by the image pickup unit 316 as shown in FIG. 1. As a result, the IGBT 214a turns on, and the xenon lamp, which is the light-emitting element 212, emits light as a flash.

Figure 7A:
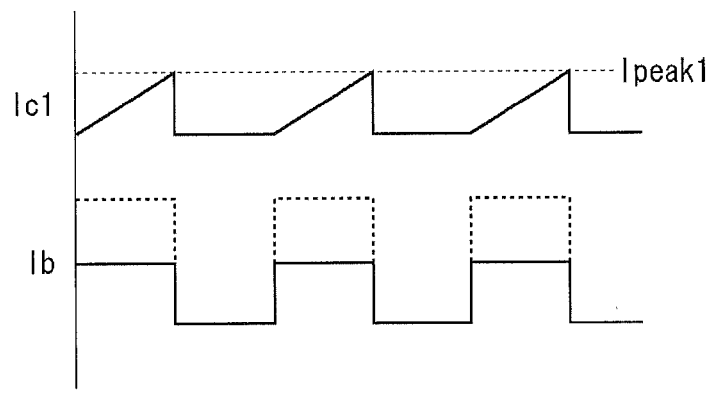
FIGS. 7A to 7C are timing charts each showing a base current supplied to a switching transistor and a primary current.
Figure 7B:
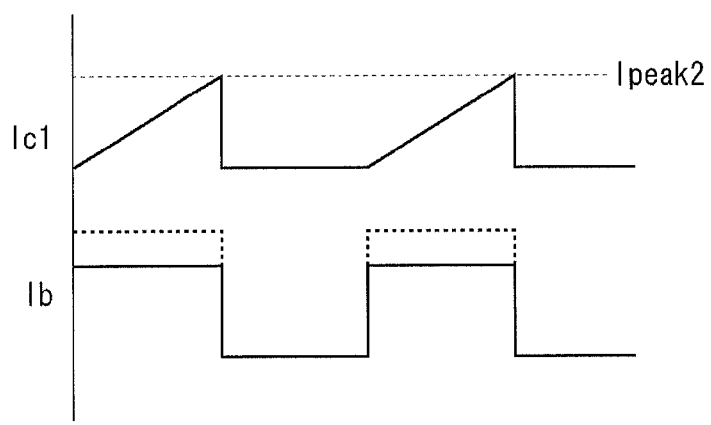
Figure 7C:
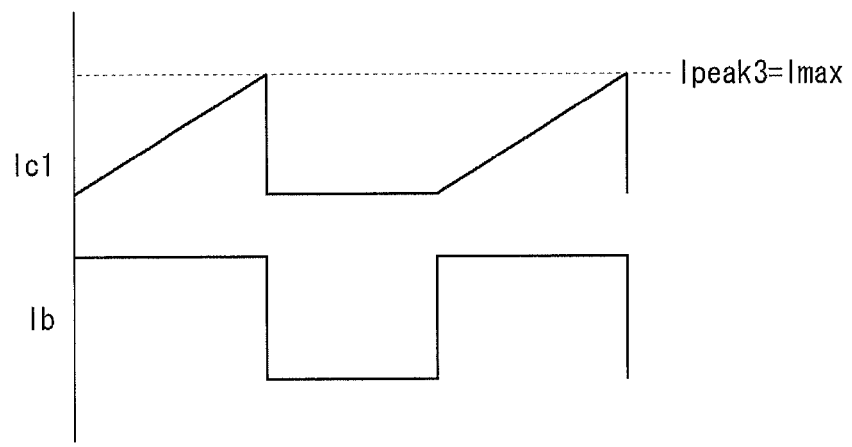

FIGS. 7A to 7C are timing charts each showing a base current Ib supplied to a switching transistor Tr1 and a primary current Ic1. FIG. 7A illustrates a case where the current adjusting signal Vadj is small and therefore the charging current is set to a small value, whereas FIG. 7C illustrates a case where the current adjusting signal Vadj is set to a maximum value and therefore the charging current is also maximum. FIG. 7B illustrates an intermediate case of the charging current in between the above two cases. The driver circuit 36 sets the level of the base current Ib in accordance with the current adjusting signal Vadj, namely the peak value Ipeak of the primary current Ic1. As a result, the base current Ib in the case of FIG. 7B is larger than that in the case of FIG. 7A.

In the capacitor charging apparatus 210 according to the second embodiment, the charging current is set in response to the peak current Ipeak of the primary current Ic1. It is required that the base current in response to a collector current (i.e., primary current Ic1) be supplied in order to stably drive a bipolar transistor. Thus, in a case when the level of the base current Ib is to be fixed to a constant value, it is required that a base current associated with the maximum value Imax of an assumed peak current Ipeak be set beforehand. In FIGS. 7A to 7C, such a base current is shown as a dotted line. In this case, when a charging current lower than the maximum value Imax is set, a base current larger than the normally required base current is supplied to the switching transistor Tr1 and therefore a wasteful power will be consumed.

In contrast to this, the capacitor charging apparatus 210 according to the second embodiment adjusts the base current Ib in response to the charging current, namely, the primary current Ic1 flowing through the switching transistor Tr1 as a collector current. Accordingly, in a case when the primary current Ic1 is small, the base current Ib is also set to a small value, thus preventing the wasteful consumption of current.

The above-described embodiments are merely exemplary, and it is understood by those skilled in the art that various modifications to the combination of each component and process thereof are possible and such modifications are also within the scope of the present invention.

In the above embodiments a description has been given of a case where a bipolar transistor is used as the switching transistor Tr1, but a MOSFET may be used instead. In such a case, too, the same suitable drive as in the case of the bipolar can be realized. That is, if the level of charging current is large, a gate drive current may be increased or the amplitude of gate voltage may be set to a large value.

In the above embodiments a description was given of a case where the capacitor charging apparatus 210 drives the light emitting element 212, but this should not be considered as liming, and it can drive a variety of other load circuits requiring high voltage.

In the above embodiments, the setting of logical values of high level and low level is one example among many and it may be arbitrarily changed as appropriate by inversion by an inverter or the like.

Third Embodiment

FIG. 1 is a block diagram showing a structure of an electronic apparatus 300 outfitted with a light emitting apparatus 200c according to a third embodiment of the present invention. An electronic apparatus 300, which is a digital still camera, a digital video camera or a mobile phone terminal provided with an image pickup function, includes a battery 310, a DSP (Digital Signal Processor) 314, an image pickup unit 316, and a light emitting apparatus 200c.

The battery 310, which is, for instance, a lithium ion battery, outputs a voltage of about 3 to 4 V as a battery voltage Vbat. The DSP 314, which is a block for performing an overall control of the electronic apparatus 300, is connected to the image pickup unit 316 and the light emitting apparatus 200c. The image pickup unit 316 is an image-taking device such as a CCD (Charge-Coupled Device) or a CMOS sensor. The light emitting apparatus 200c is a light source that is used as a flash at the time of image pickup by the image pickup unit 316.

The light emitting apparatus 200c includes a capacitor charging apparatus 210, a light-emitting element 212, and a trigger circuit 214. A xenon tube or the like is suitably used as the light-emitting element 212. The capacitor charging apparatus 210 boosts a battery voltage Vbat supplied from the battery 310 by charging an output capacitor provided at the output thereof and supplies a drive voltage of about 300 V to the light-emitting element 212. The trigger circuit 214 is a circuit that controls the light emission timing of the light emitting apparatus 200c. The light-emitting element 212 emits light synchronously with the image pickup by the image pickup unit 316.

Figure 8:
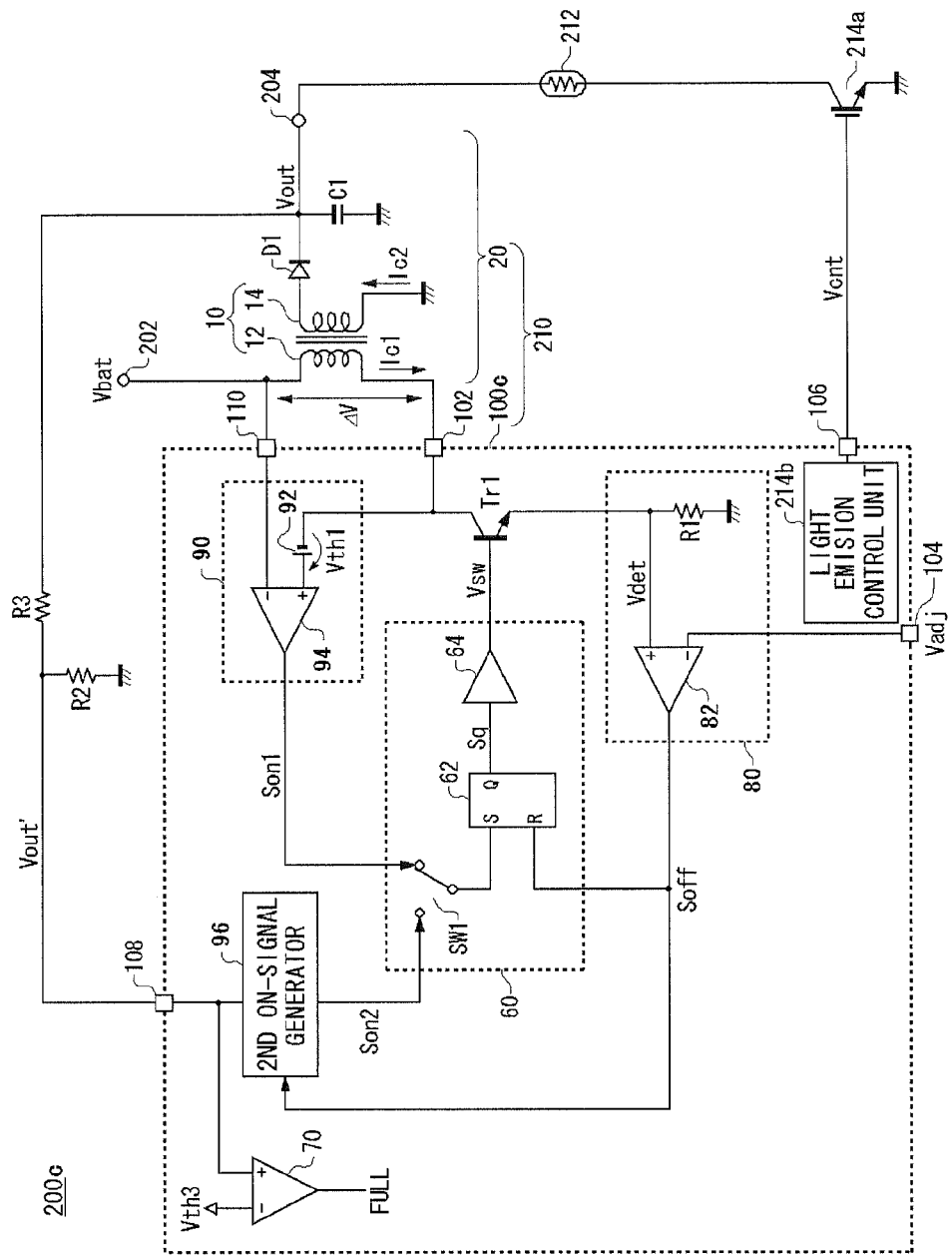
FIG. 8 is a circuit diagram showing a structure of a light emitting apparatus according to a third embodiment of the present invention.

FIG. 8 is a circuit diagram showing a structure of the light emitting apparatus 200c according to the third embodiment. The light emitting apparatus 200c includes a capacitor charging apparatus 210, a light-emitting element 212, and an IGBT 214a. A control circuit 100c, a switching transistor Tr1, a transformer 10, a rectifier diode D1 and an output capacitor C1 shown in FIG. 8 correspond to the capacitor charging apparatus 210 shown in FIG. 1. The trigger circuit 214 shown in FIG. 1 corresponds to the IGBT 214a and the light emission control unit 214b of FIG. 8.

The capacitor charging apparatus 210 generates a drive voltage (hereinafter referred to also as output voltage Vout) necessary for the light emission by the light-emitting element 212 by supplying a charging current to the output capacitor C1. The capacitor charging apparatus 210 is structured by including an output circuit 20 and a control circuit 100c.

The output circuit 20 includes a transformer 10, a rectifier diode D1, and an output capacitor C1. The transformer 10 is provided with a primary coil 12 and a secondary coil 14. One end of the primary coil 12 is the input terminal 202 of the capacitor charging apparatus 210, where the battery voltage Vbat outputted from the battery 310 of FIG. 1 is applied. The other end of the primary coil 12 is connected to the switching terminal 102 of the control circuit 100c.

One end of the secondary coil 14 of the transformer 10 is grounded to fix the potential, whereas the other end thereof is connected to an anode of the rectifier diode D1. One end of the output capacitor C1 is grounded, and the other end thereof is connected to a cathode of the rectifier diode D1. A terminal of the output capacitor C1 serves as an output terminal 204 of the capacitor charging apparatus 210 and thus outputs the voltage charged in the output capacitor C1 as an output voltage Vout.

The control circuit 100c stores energy in the transformer 10, generates a charging current for the output capacitor C1, and boosts the voltage of the battery voltage Vbat by performing a switching control of the on and off of the switching transistor Tr1. Hereinbelow, the current flowing through the primary coil 12 is called a primary current Ic1, and that flowing through the secondary coil 14 a secondary current Ic2.

The control circuit 100c includes an off-signal generator 80, a first on-signal generator 90, a second on-signal generator 96, a switching control unit 60 and a charging completion detecting circuit 70, in addition to the switching transistor Tr1. The control circuit 100c is integrated onto a single semiconductor substrate as a function IC.

The off-signal generator 80 monitors the primary current Ic1 flowing through the primary coil 12 of the transformer 10, and outputs an off signal Soff when the primary current Ic1 increases up to and reaches a predetermined peak current Ipeak. The off-signal generator 80 includes a first resistor R1 and a first comparator 82. The detection resistor R1 is provided on the same path as the primary coil 12 where the primary current Ic1 flows and the switching transistor Tr1 are, and one end thereof is grounded and the other end thereof is connected to the emitter of the switching transistor Tr1. Across the detection resistor R1 occurs a voltage drop (Vdet=Ic1×R1) in proportion to the primary current Ic1. The detection resistor R1 outputs a detection voltage Vdet according to the primary current Ic1.

To a charging current control terminal 104 of the control circuit 100c, a current adjusting signal Vadj, which is used to specify the charging current for the output capacitor C1, is inputted from outside. The first comparator 82 compares the detection voltage Vdet outputted from the primary current detection circuit against the current adjusting signal Vadj. The first comparator 82 outputs a high-level off signal Soff when it detects that the detection voltage Vdet has exceeded the current adjusting signal Vadj, that is, the primary current Ic1 has reached a predetermined current value determined according to the current adjusting signal Vadj (hereinafter referred to as peak current value Ipeak). The off signal Soff outputted from the first comparator 82 is inputted to the switching control unit 60 and the second on-signal generator 96. The relationship between the peak current value Ipeak and the current adjusting signal Vadj is expressed as Ipeak=Vadj/R1.

The switching terminal 102 of the control circuit 100c is connected to one end of the primary coil 12. The battery voltage Vbat outputted from the battery 310 is inputted to an input voltage terminal 110. A second comparator 94 shifts a voltage appearing at the switching terminal 102 to the high-potential side by a first threshold voltage Vth1 generated from a voltage supply 92 so as to compare it with the battery voltage Vbat inputted to the input terminal 110. If ΔV<Vth1, a high-level signal (hereinafter referred to as first on signal Son1) will be outputted from the second comparator 94. That is, the first on-signal generator 90 monitors the voltage ΔV across the primary coil 12 of the transformer 10; and if the voltage ΔV across the primary coil 12 drops down to the first threshold voltage Vth1, the first on-signal generator 90 will output a high-level first on signal Son1. The first on signal Son1 is inputted to the switching control unit 60.

The monitoring voltage Vout' corresponding to the output voltage Vout appearing at the output capacitor C1 is inputted to a voltage monitoring terminal 108 of the control circuit 100c. The monitoring voltage Vout' is a voltage obtained when the output voltage Vout is voltage-divided by a resistor R2 and a resistor R3. The monitoring voltage Vout' is inputted to the second on-signal generator 96.

The second on-signal generator 96 monitors the monitoring voltage Vout' and then sets an off-time Toff based on this monitoring voltage Vout'. When the off signal Soff of high level is outputted from the off-signal generator 80 and then the off-time thus set has elapsed, the second on-signal generator 96 outputs the second on signal Son2 of high level.

For example, the second on-signal generator 96 sets the off-time Toff in a manner that the larger the monitoring voltage Vout' is, namely, the larger the output voltage Vout is, the shorter the off-time Toff will become. For example, the second on-signal generator 96 can be structured by a CR time-constant circuit which charges/discharges a capacitor. In such a case, the off-time Toff can be suitably adjusted by varying the charging or discharging current according to the monitoring voltage Vout'. Also, the second on-signal generator 96 may be constituted by a digital timer.

The switching control unit 60 receives the off signal Soff outputted from the off-signal generator 80, and the first on signal Son1 and the second on signal Son2 outputted from the first on-signal generator 90 and the second on-signal generator 96, respectively. The switching control unit 60 turns off the switching transistor Tr1 in response to the off signal Soff and turns on the switching transistor Tr1 in response to the first on signal Son1 and the second on signal Son2.

In the third embodiment, the switching control unit 60 includes a flip-flop 62 and a driver circuit 64. By a switch SW1, either one of the first on signal Son1 and the second on signal Son2 is outputted to the flip-flop 62. The switch SW1 may be controlled by a user. The off signal Soff is inputted to a reset terminal of the flip-flop 62. That is, when a high level is inputted to a set terminal of the flip-flop 62 by either the first on signal Son1 or the second on signal Son2, an output signal Sq of the flip-flop 62 goes to a high level. When a high level is inputted to the reset terminal of the flip-flop 62, the output signal Sq goes to a low level.

The driver circuit 64 outputs a switching signal Vsw in response to the output signal Sq of the flip-flop 62, to the base of the switching transistor Tr1. The driver circuit 64 turns on the switching transistor Tr1 when the output signal Sq of the flip-flop 62 is in a high level, whereas the driver circuit 64 turns off the switching transistor Tr1 when the output signal Sq thereof is in a low level.

The charging completion detecting circuit 70, which is a comparator, detects the completion of a charging by comparing a monitoring voltage Vout' against a predetermined threshold voltage Vth3. The threshold voltage Vth3 is set to a voltage sufficient for light emission by the light-emitting element 212, for example, about 300 V. When the monitoring voltage Vout' exceeds the threshold voltage Vth3, the charging completion detecting circuit 70 sets a flag FULL to indicate the completion of charging. Now with the completion of charging detected by the charging completion detecting circuit 70, the switching control unit 60 stops the switching of the switching transistor Tr1.

The light emission control unit 214*b* generates a light emission control signal Vcnt and controls the base voltage of the IGBT 214*a*. When the light emission control signal Vcnt goes to a high level with a charging of the output capacitor C1 completed and sufficient drive voltage Vout generated, the IGBT 214*a* turns on and the light-emitting element 212 emits light.

Figure 9:
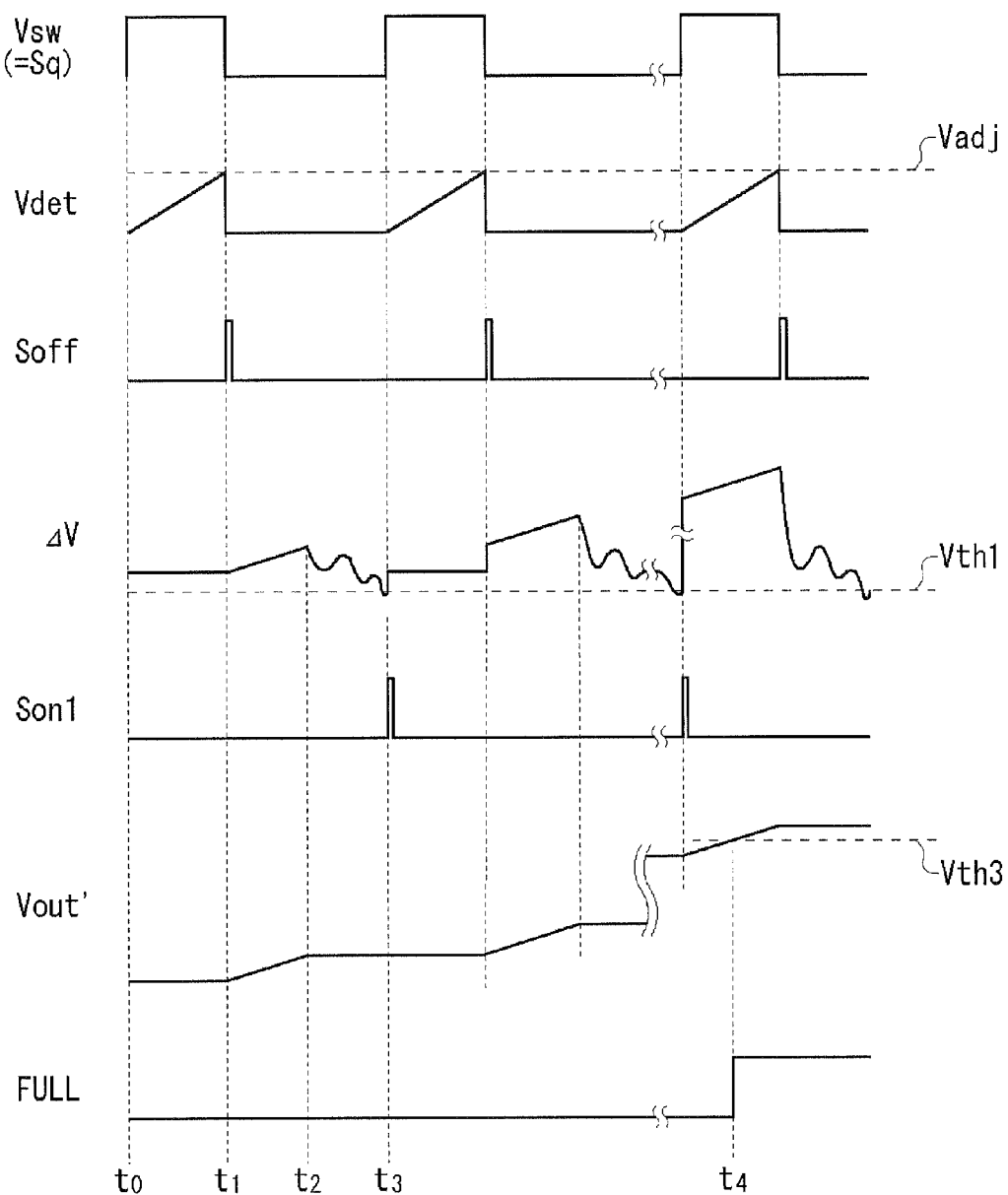
FIG. 9 is a timing chart showing a switching operation in response to a first on signal of a capacitor charging apparatus shown in FIG. 8.
Figure 10:
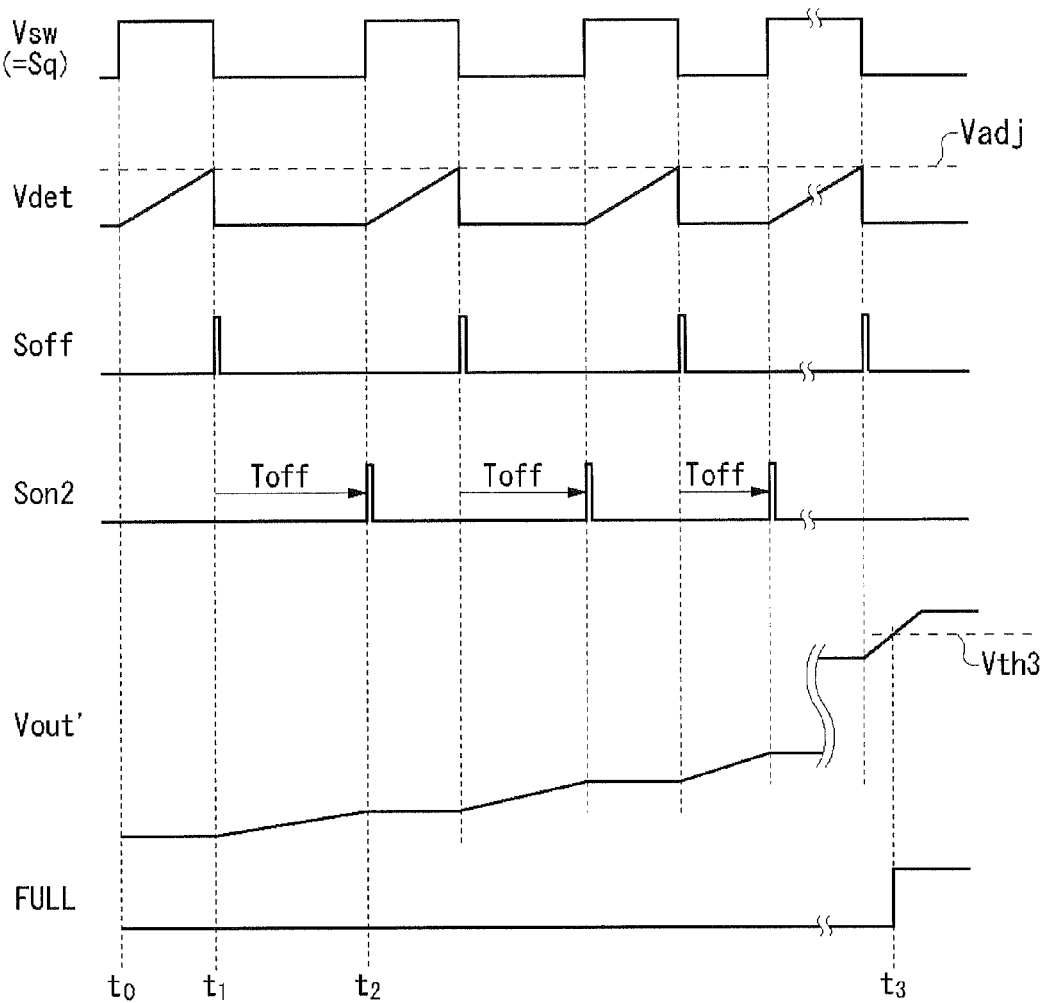
FIG. 10 is a timing chart showing a switching operation in response to a second on signal of a capacitor charging apparatus shown in FIG. 8.

Now a description will be given of an operation of the light emitting apparatus 200*c* configured as described above. FIGS. 9 and 10 are each a timing chart showing an operation of a capacitor charging apparatus 210 according to the third embodiment. FIG. 9 shows a switching operation in response to the first on signal Son1, whereas FIG. 10 shows a switching operation in response to the second on signal Son2. Note that the vertical axis and the horizontal axis of FIG. 9 and FIG. 10 are enlarged or reduced as appropriate for ease of understanding and also that the waveforms shown therein are simplified for easier understanding.

With reference to FIG. 9, a description is first given of a charging operation according to the off signal Soff and the first on signal Son1. At time t0, a switching signal Vsw goes to a high level and therefore the switching transistor Tr1 turns on. At this time, the output signal Sq of the flip-flop is in a high level.

With the switching transistor Tr1 turned on, a primary current Ic1 flowing through the primary coil 12 of the transformer 10 gradually increases with time and this increase in the primary current Ic1 causes the detection voltage Vdet to rise.

When Vdet>Vadj at time t1, namely when the primary current Ic1 has reached the peak current value Ipeak, the off signal Soff outputted from the first comparator 82 goes to a high level. Then the flip-flop 62 is reset and, as a result, the output signal Sq transits to a low level. As the output signal Sq goes to the low level, the switching signal Vsw goes also to a low level, thereby turning off the switching transistor Tr1.

For a period of time t0 to t1 during which the switching transistor Tr1 is on, the voltage across the primary coil 12 is $\Delta V \approx V_{bat} - V_{sat}$. Here, Vsat is the sum voltage of an emitter-collector voltage of the switching transistor Tr1 and the detection voltage Vdet.

As the switching transistor Tr1 turns off at time t1, the energy stored in the transformer 10 is discharged as a secondary current Ic2. The secondary current Ic2 flows into the output capacitor C1 as a charging current and the output voltage Vout rises. When the energy stored in the transformer 10 has been completely expended at time t2, the output voltage Vout stops rising.

During a period of time t1 to t2, the voltage $\Delta V$ across the primary coil 12 is $\Delta V \approx V_{out}/n$. Here, n is a turns ratio of the primary coil 12 and the secondary coil 14 of the transformer 10. When the energy stored in the transformer 10 has been completely discharged at time t2, the voltage $\Delta V$ across the primary coil 12 damped-oscillates due to the LC oscillation. As the voltage $\Delta V$ across the primary coil 12 becomes less than the first threshold voltage Vth1 at time t3, the second comparator 94 outputs the first on signal Son1 of high level. This first on signal Son1 sets the flip-flop 62, so that the output signal Sq transits to a high level and the switching transistor Tr1 turns on again.

By repeating the cycle of operation from t1 to t3, the control circuit 100*c* charges the output capacitor C1. This charging operation raises the output voltage Vout. And when the monitoring voltage Vout' has reached the threshold voltage Vth3 at time t4, a flag FULL indicating the completion of charging is set by the charging completion detecting circuit 70, which enables a light emission by the light-emitting element 212. After the charging has been completed, the light emission control unit 214*b* switches the light emission control signal Vcnt to a high level in synchronism with an image pickup by the image pickup unit 316 as shown in FIG. 1. As a result, the IGBT 214*a* turns on, and the xenon lamp, which is the light-emitting element 212, emits light as a flash.

Next, with reference to FIG. 10, a description is given of a charging operation according to the off signal Soff and the second on signal Son2. At time t0, the output signal Sq of the flip-flop 62 goes to a high level, thereby turning on the switching transistor Tr1.

With the switching transistor Tr1 turned on, the primary current Tc1 flowing through the primary coil 12 of the transformer 10 gradually increases with time, which in turn raises the detection voltage Vdet.

With Vdet>Vadj at time t1, the off signal Soff outputted from the first comparator 82 goes to a high level, the flip-flop 62 is reset and the output signal Sq thereof transits to a low level. As the output signal Sq goes to the low level, the switching signal Vsw also goes to a low level, thus turning off the switching transistor Tr1.

As the switching transistor Tr1 turns off at time t1, the energy stored in the transformer 10 is discharged as a secondary current Ic2. The secondary current Ic2 flows into the output capacitor C1 as a charging current and the output voltage Vout rises.

The second on-signal generator 96 outputs a second on signal Son2 which goes to a high level from time t1 when a high-level off signal Soff is outputted until time t2 after the passage of an off-time Toff set according to the monitoring voltage Vout'. The flip-flop 62 is set by this second on signal Son2, then the output signal Sq shifts to a high level and the switching transistor Tr1 turns on again.

By repeating the cycle of operation from t0 to t2, the control circuit 100c charges the output capacitor C1 and raises the output voltage Vout. When the monitoring voltage Vout' has reached the threshold voltage Vth3 at time t3, a flag FULL indicating the completion of charging is set by the charging completion detecting circuit 70, which enables a light emission by the light-emitting element 212.

In the control performed based on the first on signal Son1 of the capacitor charging apparatus 210 according to the third embodiment, the switching transistor Tr1 is turned on after the energy stored in the transformer 10 has been completely discharged. Hence, the high efficiency can be realized. Also, by performing the control based on the second on signal Son2, the energy can be used efficiently, immediately after a start of charging, because of a longer off-time. Hence, as the output voltage Vout increases, the charge rate can be accelerate with a shorter off-time.

Further, by employing the capacitor charging apparatus 210 according to the third embodiment, the control can be switched between the control based on the first on signal Son1 as shown in FIG. 9 and the control based on the second on signal Son2 as shown in FIG. 10. As a result, either a circuit operation where the efficiency is given priority or a circuit operation where the charge rate is given priority can be selected according to its application or the like.

Fourth Embodiment

Figure 11:
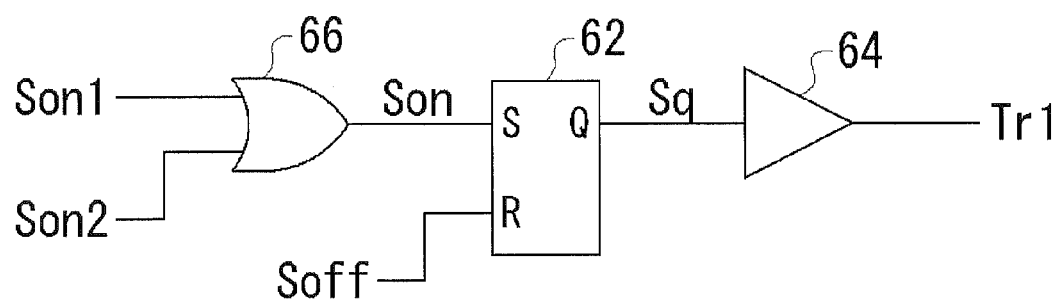
FIG. 11 is a circuit diagram showing a structure of a switching control unit in a capacitor charging apparatus according to a fourth embodiment of the present invention.

FIG. 11 is a circuit diagram showing a structure of a switching control unit 60a in a capacitor charging apparatus 210 according to a fourth embodiment of the present invention. In the third embodiment, a description has been given of a case where the timing at which the switching transistor Tr1 turns on is determined according to either one of the first on signal Son1 and the second on signal Son2 selected by the switch SW1. In contrast to this, in this fourth embodiment the switching transistor Tr1 turns on according to the on signal, whichever first goes to a high level, of either the first on signal Son1 or the second on signal Son2.

The switching control unit 60a according to the fourth embodiment includes an OR gate 66 in place of the switch SW1 of FIG. 8. The connection state of a flip-flop 62 and a driver circuit 64 is the same as that shown in FIG. 8. A first on signal Son1 and a second on signal Son2 are inputted to the OR gate 66. In such a case, an output signal Son of the OR gate 66 is a logical sum of the first on signal Son1 and the second on signal Son2. Thus, at the point when either one of the first on signal Son1 and the second on signal Son2 goes to a high level, the output signal Son goes to a high level, too.

The output signal Son of the OR gate 66 is inputted to a set terminal of the flip-flop 62. Thus, at the timing when either one of the first on signal Son1 and the second on signal Son2 whichever first goes to a high level, the flip-flop 62 is rest. The reset operation of the flip-flop 62 is the same as that described in the third embodiment.

According to the capacitor charging apparatus 210 of the fourth embodiment, the switching transistor Tr1 turns on in response to either one of first on signal Son1 and the second on signal Son2 whichever first goes to a high level. Hence, even in the case when the timing at which the first on signal Son1 goes to a high level is delayed excessively or the timing at which the second on signal Son2 goes to a high level is delayed excessively, that the off-time of the switching transistor Tr1, namely, the discharge time of energy stored in the transformer 10 becomes longer than necessary can be prevented from occurring.

As the output voltage Vout increases, the timing at which the second on signal Son2 goes to a high level comes earlier. As a result, the tendency that the timing at which the switching transistor Tr1 turns on is determined by the second on signal Son2 becomes more significant in an area where the output voltage Vout is high. Accordingly, there is an advantageous effect in that a rapid charging can be achieved by properly setting the timing of the off-time Toff set by the second on-signal generator 96, namely, the timing at which the second on signal Son2 goes to a high level.

Figure 12:
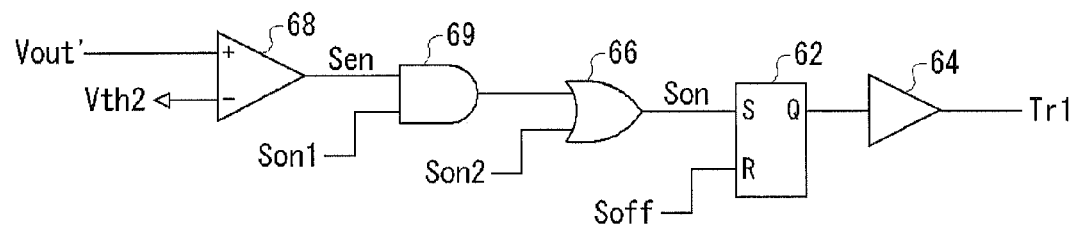
FIG. 12 is a circuit diagram showing a modification of the switching control unit shown in FIG. 11.

FIG. 12 is a circuit diagram showing a modification (60b) of the switching control unit according to the fourth embodiment shown in FIG. 11. In addition to the structure shown in FIG. 11, the switching control unit 60 includes a function of monitoring a voltage corresponding to the output voltage Vout appearing at the output capacitor C1 and a setting function of whether to turn on the switching transistor Tr1 in response to either one of the first on signal Son1 and the second on signal Son2 according to the output voltage Vout.

In addition to the switching control unit 60a shown in FIG. 11, the switching control unit 60b shown in FIG. 12 includes a comparator 68 and an AND gate 69. The comparator 68 monitors a voltage Vout' corresponding to the output voltage Vout appearing at the output capacitor C1 and then compares the voltage Vout' against a second predetermined threshold voltage Vth2. The voltage Vout' monitored by the comparator 68 may be the same voltage as the monitoring voltage Vout' monitored by the charging completion detecting circuit 70 or may be different therefrom. An output signal Sen of the comparator 68 goes to a high level when Vout'>Vth2, whereas it goes to a low level when Vout'<Vth2.

The AND gate 69 outputs the logical product of the output signal Sen of the comparator 68 and the first on signal Son1. When Vout'>Vth2, the logical value of an output signal Son1' of the AND gate 69 is equal to the logical value of the first on signal Son1. When Vout'<Vth2, the logical value thereof is fixed to the low level. That is, when the output voltage Vout is lower than a predetermined fixed value, the comparator 68 and the AND gate 69 carry out a function of disabling the first on signal Son1. This predetermined value is preferably set to a value of about 20 V to 50 V.

The OR gate 66 outputs the logical sum of the output signal Son1' of the AND gate 69 and the second on signal Son2 to a set terminal of the flip-flop 62. Other structures and operations are the same as those in the switching control unit 60a.

In an area where the output voltage Vout is low, the switching control unit 60b of FIG. 12 disables the first on signal Son1 by the AND gate 69. However, the generation of the first on signal Son1 may be stopped by stopping the operation of the first on-signal generator 90 itself.

When the output voltage Vout is lower than a predetermined value, the switching control unit 60b disables the switching of the switching transistor Tr1 according to the first on signal Son1, and performs the switching of the switching transistor Tr1 according to the off signal Soff and the second on signal Son2. When the output voltage Vout becomes higher than the predetermined value, the same circuit operation as that of the switching control unit 60a shown in FIG. 11 is performed.

When the output voltage Vout is low, a voltage ΔV appearing across the primary coil 12 in an off state of the switching transistor Tr1 is small. Thus, because of the spike noise, ringing or the like, it is possible that the voltage ΔV becomes lower than the first threshold voltage Vth1 even before the energy stored in the transformer 10 is expended. Further, it is possible that the on-timing of the switching transistor Tr1 is adversely affected and thereby the normal circuit operation is interrupted. In contrast thereto, by employing the switching control unit 60b of FIG. 12, the control is performed by the second on signal Son2 generated by the second on-signal generator 96 when the output voltage Vout is low. As a result, the switching operation can be stably performed without the effect of noise and the like.

Fifth Embodiment

In the first and the fourth embodiment, a description was given of a case where the second on-signal generator 96 takes, as the monitoring voltage Vout', a voltage obtained when the output voltage Vout appearing at the output capacitor C1 is voltage-divided by the resistor R2 and the resistor R3 and then sets the off-time Toff and detects the charging completion. If the output voltage Vout rises up to several hundreds of voltages, high voltage resistant elements will be required as the resistors R2 and R3, thus causing a problem of an increase in the number of circuit components. A fifth embodiment described hereinbelow provides a technique wherein the output voltage Vout is monitored with a simpler circuit configuration so as to be reflected in the switching operation of the switching transistor Tr1.

Figure 13:
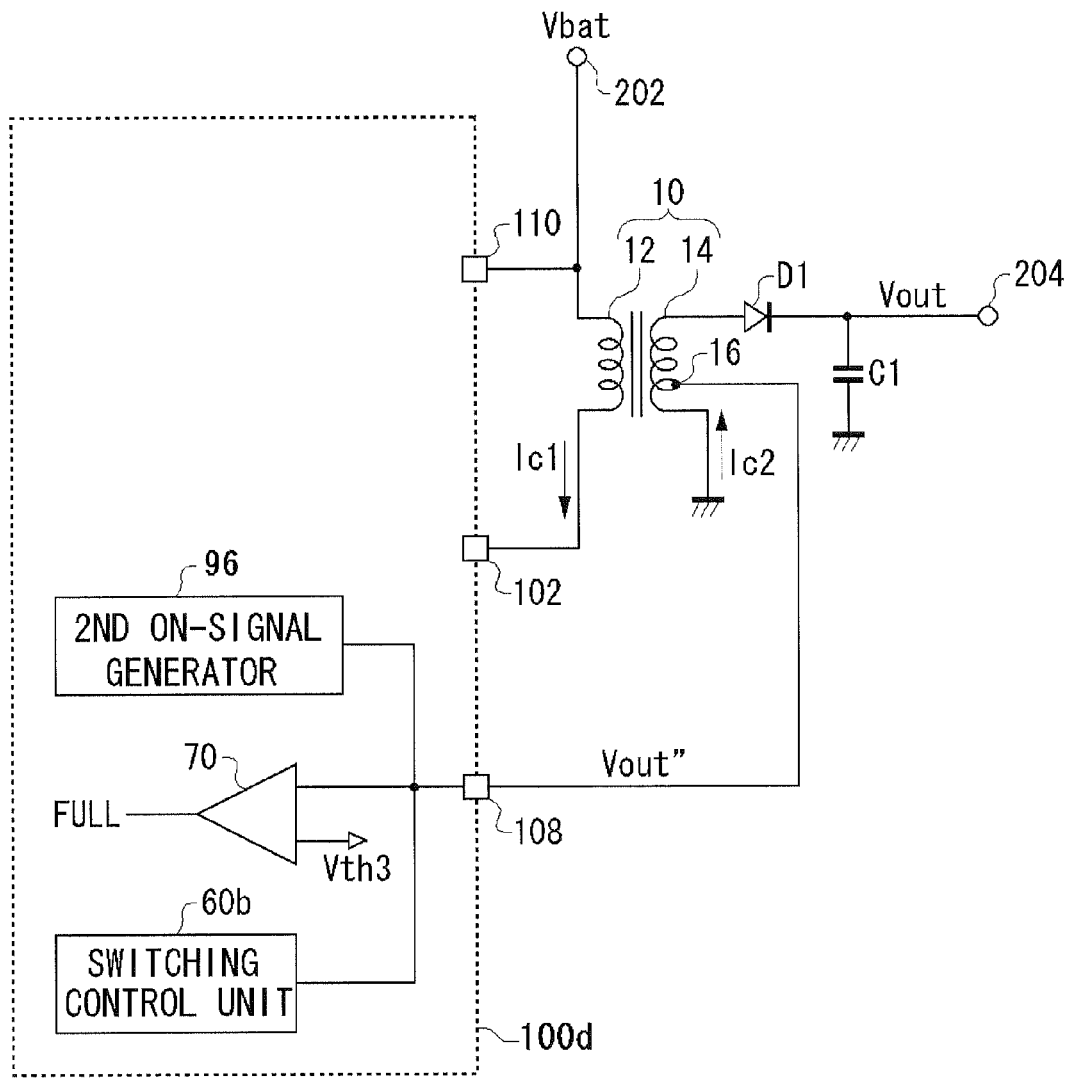
FIG. 13 is a circuit diagram showing a partial structure of a capacitor charging apparatus according to a fifth embodiment of the present invention.

FIG. 13 is a circuit diagram showing a partial structure of a capacitor charging apparatus 210 according to the fifth embodiment. FIG. 13 shows a circuit configuration which differs from that of FIG. 8 but the components in common with those in FIG. 8 are omitted. In the fifth embodiment, a tap 16 (F winding) is provided on a secondary coil 14 of a transformer 10, and a voltage Vout" appearing at the tap 16 is inputted to a voltage monitoring terminal 108. A voltage corresponding to an output voltage Vout appearing at the output capacitor C1 appears at the tap 16. More specifically, the voltage is approximately proportional to the output voltage Vout.

The capacitor charging apparatus 210 according to the fifth embodiment takes, as a monitoring voltage, the voltage Vout" appearing at the tap 16 of the secondary coil 14 and controls the switching operation of a switching transistor Tr1. For example, a second on-signal generator 96 may set an off-time Toff according to the monitoring voltage Vout" inputted to the voltage monitoring terminal 108. A charging completion detecting circuit 70 may detect the completion of charging according to the monitoring voltage Vout". The switching control unit 60b shown in FIG. 12 may disable a first on signal Son1 according to the monitoring voltage Vout".

According to the fifth embodiment, the voltage in response to the output voltage Vout can be detected with accuracy and this accurately detected voltage can be reflected in the switching operation of the switching transistor Tr1. The tap 16 is provided on the ground side of the secondary coil 14, namely, on the low voltage side. This eliminates the use of resistors for voltage division. Or, even if the resistors for voltage division are required, they need not be any high voltage resistant elements, so that the number of circuit elements used can be reduced.

Sixth Embodiment

In a sixth embodiment, a description will be given of a technique concerning the reduction in size of the capacitor charging apparatus. The transformer 10 described with reference to FIG. 8 or FIG. 13 is comprised of four terminals or five terminals, respectively. The increased number of terminals poses a hindrance to reducing the size in components of the transformer 10. In particular, when it is installed in a digital camera or mobile phone terminal, demand for small size is very high among users. A capacitor charging apparatus, described hereinbelow, according to the sixth embodiment reduces the number of terminals of the transformer 10 and thereby achieves a compact size of the apparatus.

Figure 14:
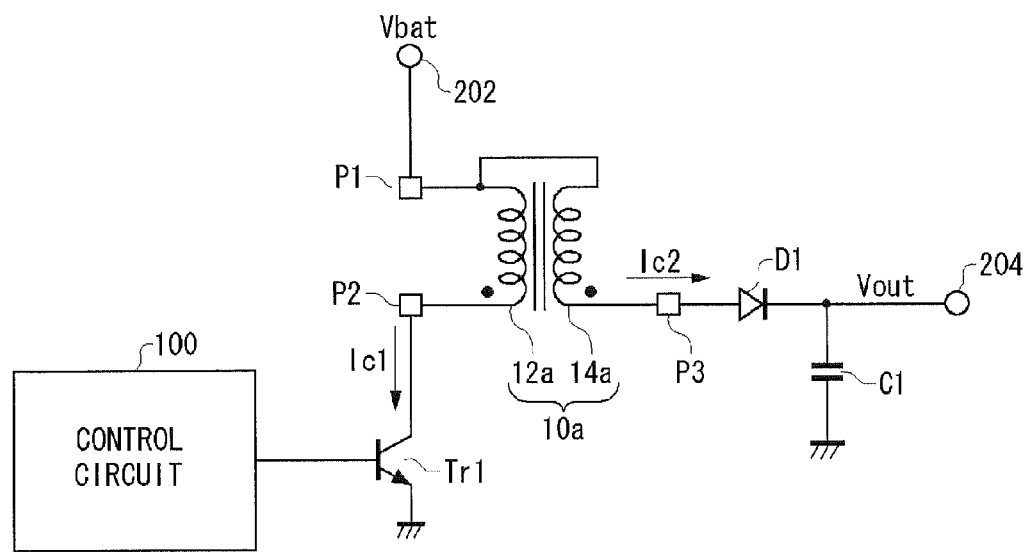
FIG. 14 is a block diagram showing a structure of a capacitor charging apparatus according to a sixth embodiment of the present invention.

FIG. 14 is a block diagram showing a structure of a capacitor charging apparatus 210a according to a sixth embodiment. A structure of a transformer 10a which is the main feature of this sixth embodiment will first be described. The transformer 10a of FIG. 14 includes a primary coil 12a and a secondary coil 14a. One end of the primary coil 12a is connected in common with one end of the secondary coil 14a, and a terminal P1 is so provided as to form a common connection point thereof. A terminal P2 and a terminal P3 are provided for the other ends of the primary coil 12a and the secondary coil 14a, respectively. The transformer 10 shown in FIG. 8 has four terminals, whereas the transformer 10a shown in FIG. 14 has three terminals, which is one less than those of FIG. 8. As a result, the transformer 10a of FIG. 14 can achieve a smaller size than the transformer 10 of FIG. 8, so that the capacitor charging apparatus 210 as a whole can achieve a smaller size.

Next, a general structure of the capacitor charging apparatus 210a shown in FIG. 14 will be described.

A first terminal P1, where the one end of the primary coil 12a is connected in common with the one end of the secondary coil 14a, is connected to an input terminal 202, where a battery voltage Vbat is applied as an input voltage.

A switching transistor Tr1 is connected to a second terminal P2 which is provided on the other end of the primary coil 12a of the transformer 10a. An anode of a rectifier diode D1 is connected to a third terminal P3 which is provided on the other end of the secondary coil 14a. An output capacitor C1 is provided between a cathode of the rectifier diode D1 and ground. A voltage appearing at the output capacitor C1 is outputted from an output terminal 204 as an output voltage Vout. A control circuit 100c generates a switching signal Vsw and controls the on and off of the switching transistor Tr1 by supplying the switching signal Vsw thereto.

The control circuit 100c may be configured by using the control circuit shown in FIG. 8 or FIG. 13, a control circuit of other types or a self-excited control circuit incorporating an oscillator therein. In the sixth embodiment, means for turning on and off the switching transistor Tr1 is not limited to any particular one.

Now a description will be given of an operation of a capacitor charging apparatus 210a configured as described above. As the switching transistor Tr1 turns on and off, a primary current Ic1 flows through the primary coil 12a of the transformer 10a from the first terminal P1 toward the second terminal P2. At the same time, a secondary current Ic2 flows through the secondary coil 14a from the first terminal P1 toward the third terminal P3. The output capacitor C1 is charged with this secondary current Ic2 so as to generate a high-voltage output voltage Vout. In the capacitor charging apparatus 210a according to the sixth embodiment, the transformer 10a thereof can be made smaller, so that the capacitor charging apparatus 210a can be made smaller than that shown in FIG. 8.

Figure 15:
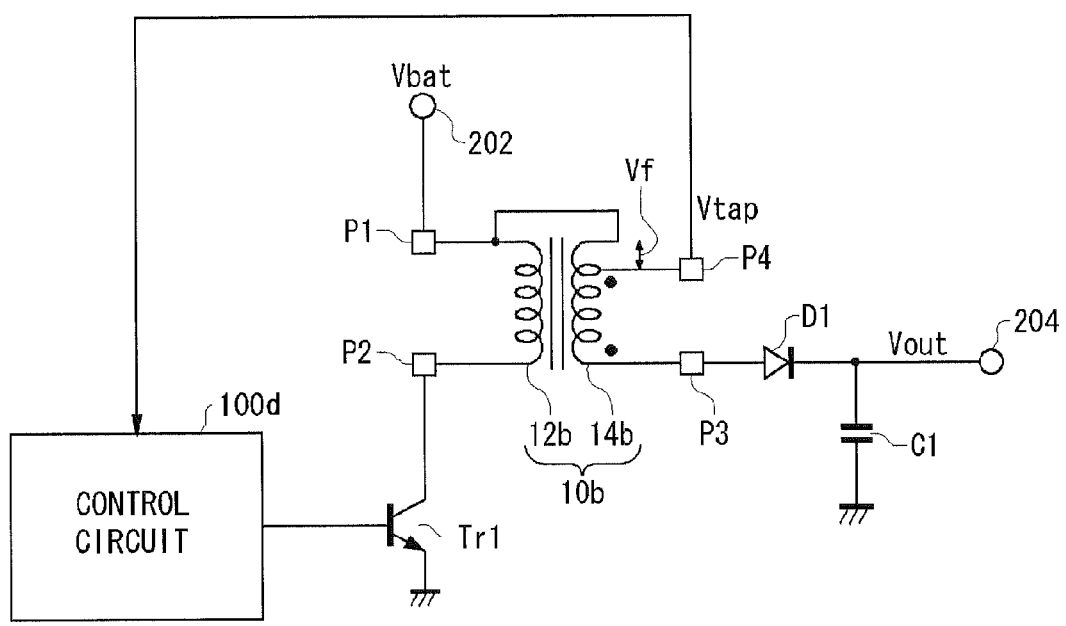
FIG. 15 is a circuit diagram showing a modification of the capacitor charging apparatus shown in FIG. 14.

FIG. 15 is a circuit diagram showing a modification of the capacitor charging apparatus 210 shown in FIG. 14. In a transformer 10b shown in FIG. 15, a tap is provided on the secondary coil 14b and a fourth terminal P4 is provided for this tap. A control circuit 100d performs part of an on-off control of at least the switching transistor Tr1.

Let the turns ratio of the number of turns in the secondary coil 14b (from the first terminal P1 through the fourth terminal P4) to the number of turns in the primary coil 12b (from the first terminal P1 through the third terminal P3) be expressed as 1:NF. Then, the following relations expressed by Equation (1) and Equation (2) hold among a tap voltage Vtap, a battery voltage Vbat and an output voltage Vout.

$$Vout = Vbat + Vf \times NF \quad (1)$$

$$Vf = Vtap - Vbat \quad (2)$$

If Equations (1) and (2) are rearranged and solved for Vtap, Equation (3) will be derived.

$$Vtap = Vout/NF + Vbat \times \alpha \quad (3)$$

The tap voltage Vtap is a voltage directly related to the output Vout. Here, $\alpha = (NF-1)/NF$. If Vbat is sufficiently small relative to Vout, Vtap can be approximated as follows.

$$Vtap \approx Vout/NF \quad (4)$$

That is, the control circuit 100d of FIG. 15 can control the switching transistor Tr1 in a manner that the tap voltage Vtap is brought to correspondence with the monitoring voltage Vout" indicated in the capacitor charging apparatus 210. For instance, the control circuit 100d shown in FIG. 15 may be configured in the same manner as the control circuit 100c shown FIG. 13. That is, the off-time Toff may be set according to the tap voltage Vtap. Also, the completion of charging may be detected according to the tap voltage Vtap. Also, the first on signal Son1 may be disabled according to the tap voltage Vtap.

If the tap voltage Vtap of FIG. 15 is to be monitored, the following advantage will be attained compared with the case when the monitoring voltage Vout" is monitored. In FIG. 13, one end of the secondary coil 14 of the transformer 10 is grounded and set to 0 V. As a result, there are cases where the monitoring voltage Vout" becomes negative according to the switching of the switching transistor Tr1. In contrast thereto, since the terminal fixed to the ground voltage (0 V) is fixed to the battery voltage Vbat, it is advantageous that the tap voltage Vtap of FIG. 15 will not become negative.

The provision of five terminals is needed for the transformer of FIG. 13, whereas four terminals suffice for the transformer 10b of FIG. 15. Thus, the transformer 10b can be made smaller in size and at the same time the size of the capacitor charging apparatus 210b as a whole can be made smaller.

Now, a description will be given of a correction of variation in the battery voltage Vbat. If the term Vbat is not negligible in Equation (3), the tap voltage Vtap will depend on the battery voltage Vbat. The battery voltage Vbat varies according to the charging state of the battery and a consumption degree thereof. In the light of this, the following processing may be performed.

Figure 16:
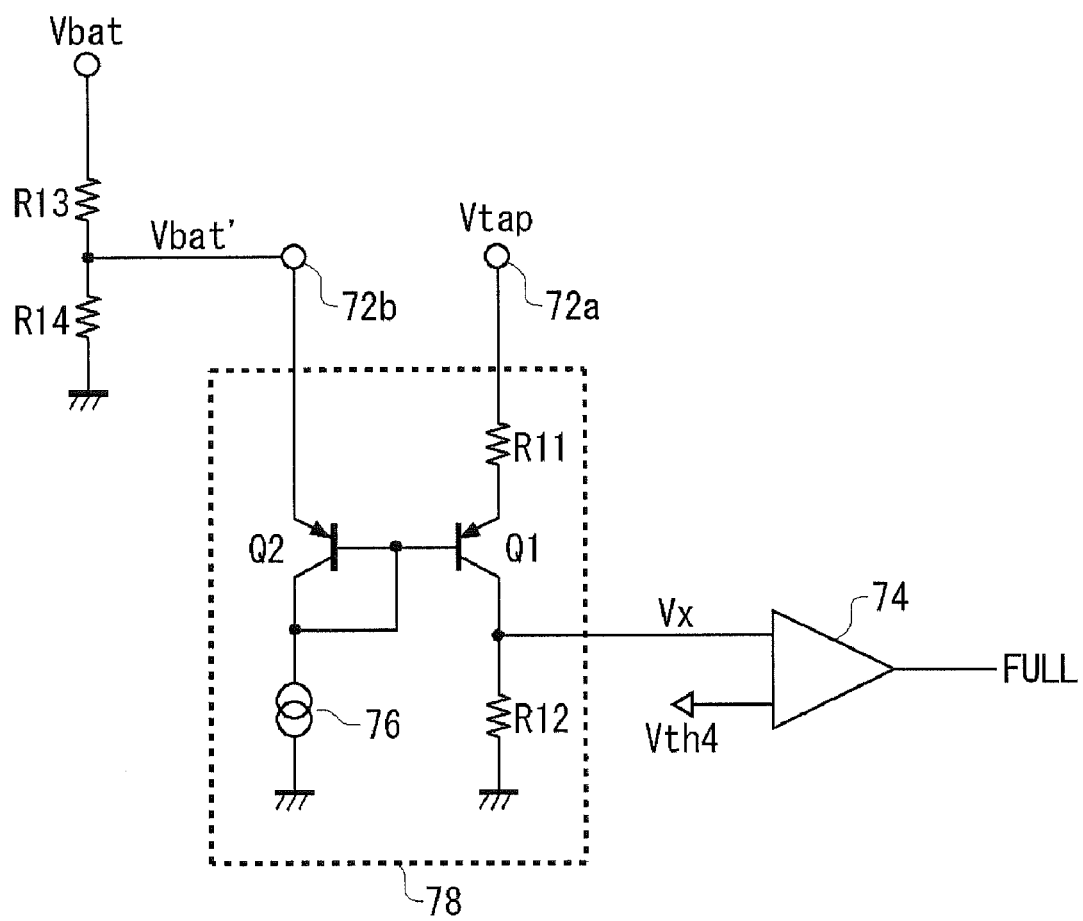
FIG. 16 is a circuit diagram showing a structure of a charging completion detecting circuit that detects the completion of charging.

According to an embodiment, the completion of charging is detected by monitoring the tap voltage Vtap. FIG. 16 is a circuit diagram showing a structure of a charging completion detecting circuit 70a that detects the completion of charging. An input terminal 72a is connected to the fourth terminal P4 provided in the transformer 10b, where the tap voltage Vtap is applied. The charging completion detecting circuit 70a includes a difference voltage generation circuit 78, a comparator 74, and resistors R13 and R14.

The difference voltage generation circuit 78 generates a voltage Vx corresponding to a difference voltage between a terminal 72a and a terminal 72b, and then outputs the voltage Vx. The difference voltage generation circuit 78 includes resistors R11 and R12, transistors Q1 and Q2, and a constant current source 76. The transistors Q1 and Q2 are each a PNP bipolar transistor and are connected to each other, in a current-mirror configuration, with the bases thereof connected in common. The resistor R12 is provided between a collector of the transistor Q1 and ground, whereas the resistor R11 is provided between an emitter of the transistor Q1 and the terminal 72a. The constant current source 76 is provided between a collector of the transistor Q2 and ground, whereas an emitter of the transistor Q2 is connected to the terminal 72b. A voltage Vbat' where a battery voltage Vbat has been subjected to a voltage division is applied to the terminal 72b. Then the voltage Vx of the collector of the transistor Q1 is given by the following Equation (5).

$$Vx = (Vbat' - Vtap) \times R12/R11 \quad (5)$$

Note that the voltage Vx is proportional to the potential difference between the terminal 72a and the terminal 72b. Note also that a subtractor, configured by the use of an operational amplifier, or other circuits may be utilized as the difference voltage generation circuit.

The comparator 74 compares the voltage Vx against the threshold voltage Vth4. When $Vx \geq Vth4$, the comparator 74 sets a flag FULL indicating the completion of charging.

The division ratio determined by the resistor R13 and the resistor R14 is so set as to be $\alpha = (NF-1)/NF$. As a result, the following Equation (6) holds.

$$Vx = (\alpha \cdot Vbat - Vtap) \times R12/R11 \quad (6)$$

Put Vx=Vth4 in Equation (6) and Equation (3) and proceed to rearrange them. Then the following Equation (7) will hold at the time of the completion of charging.

$$Vth4 = Vout/NF \times R12/R11 \quad (7)$$

That is, the output voltage at the time of the completion of charging (hereinafter denoted by VFULL) will be as follows.

$$VFULL = NF \times R11/R12 \times Vth4 \quad (8)$$

In this manner, by employing the charging completion detecting circuit 70a of FIG. 16, the output voltage Vout at the time of the completion of charging can be stabilized to a steady constant value VFULL regardless of the consumption degree of a battery.

The charging completion detecting circuit 70a generates a voltage corresponding to the tap voltage Vtap in a manner that a voltage, obtained after the battery voltage Vbat (i.e., input voltage) is multiplied by a coefficient $\alpha$, is subtracted from the tap voltage Vtap. Then the charging completion detecting circuit 70 compares this voltage against the threshold voltage Vth4 to detect the completion of charging. This is practically equivalent to correcting a threshold value for the charging completion by the use of the battery voltage Vbat and the constant $\alpha$.

The above-described embodiments are merely exemplary, and it is understood by those skilled in the art that various further modifications to the combination of each component and process thereof are possible and such modifications are also within the scope of the present invention.

In the present embodiments, a description has been given of a case where a bipolar transistor is used as the switching transistor Tr1. However, a MOSFET may be used instead. Also, in the present embodiments, a description has been given of a case where the capacitor charging apparatus 210 drives the light-emitting element 212 but this should not be considered as limiting and it may also be used to drive a variety of other load circuits requiring high voltage.

Also, the setting of logical values of high level and low level described in the present embodiments is only one example. The setting can be changed freely by inverting them as appropriate by an inverter or the like.

While the preferred embodiments of the present invention have been described using specific terms, such description is for illustrative purposes only, and it is to be understood that changes and variations may be further made without departing from the spirit or scope of the appended claims.

What is claimed is:

1. A control circuit of a capacitor charging apparatus, the capacitor charging apparatus including a transformer and an output capacitor charged with current flowing through a secondary coil of the transformer, which charges the output capacitor by performing a switching control of a switching transistor provided on a path leading to a primary coil of the transformer, the control circuit comprising:
   a primary-current detection circuit which detects a primary current flowing through the primary coil of the transformer; and
   a switching control unit which monitors at least the primary current detected by said primary-current detection circuit and outputs to a control terminal of the switching transistor a switching signal for specifying ON to the switching transistor until the primary current reaches a predetermined peak current value and then specifying OFF to the switching transistor during an off-time,
   wherein said switching control unit adjusts the switching signal outputted to the control terminal of the switching transistor, according to the predetermined peak current value, wherein the switching transistor is a bipolar transistor, and
   wherein said switching control unit adjusts a current value of a base current, which is supplied to a base of the bipolar transistor as the switching signal, in accordance with the predetermined peak current value.

2. A control circuit according to claim 1, wherein said switching control unit sets the current value of a base current in such a manner that the larger the predetermined peak current value is, the larger the current value of a base current becomes.

3. A control circuit according to claim 2, wherein said switching control unit sets the current value of a base current in such a manner the current value of a base current is proportional to the predetermined peak current value.

4. A control circuit according to claim 1, wherein said switching control unit includes a current generator which receives a current adjustment signal specifying the predetermined peak current value and generates a current in accordance with the current adjustment signal, and
   wherein the current generated by the current generator is supplied to a base of the switching transistor as a switching signal in a period during which the switching transistor is to turn on.

5. A control circuit according to claim 4, wherein the current adjustment signal is inputted to a charge current control terminal provided in said control circuit, from outside said control circuit.

6. A control circuit according to claim 1, wherein said switching control unit includes:
   a current generator which generates a current according to the predetermined peak current value; and
   a driver circuit which supplies the current generated by said current generator as the base current of the bipolar transistor serving as the switching transistor, in a period during which the switching transistor is to turn on.

7. A control circuit according to claim 6, wherein said current generator includes:
   a voltage to current conversion circuit configured to receive a current adjustment signal specifying the predetermined peak current value and to generate a current in accordance with the current adjustment signal; and
   a current amplifier circuit configured to amplify the current generated by the voltage to current conversion circuit.

8. A control circuit according to claim 1, wherein said control circuit is integrated onto a single semiconductor substrate.

9. A capacitor charging apparatus, comprising:
   a transformer, including a primary coil and a secondary coil, wherein an input voltage is applied to one end of the primary coil and a switching transistor is connected to other end thereof;
   an output capacitor one end of which is grounded;
   a diode having an anode thereof connected to a secondary coil side of said transformer and a cathode thereof connected to the other-end side of said output capacitor; and
   a control circuit, which controls on and off of the switching transistor, wherein the control circuit comprises:
   a primary-current detection circuit which detects a primary current flowing through the primary coil of the transformer; and
   a switching control unit which monitors at least the primary current detected by said primary-current detection circuit and outputs to a control terminal of the switching transistor a switching signal for specifying ON to the switching transistor until the primary current reaches a predetermined peak current value and then specifying OFF to the switching transistor during an off-time,
   wherein said switching control unit adjusts the switching signal outputted to the control terminal of the switching transistor, according to the predetermined peak current value, wherein the switching transistor is a bipolar transistor, and
   wherein said switching control unit adjusts a current value of a base current, which is supplied to a base of the bipolar transistor as the switching signal, in accordance with the predetermined peak current value.

10. A light emitting apparatus, comprising:
    a capacitor charging apparatus according to claim 9; and
    a light-emitting element driven by an output voltage appearing at the output capacitor in said capacitor charging apparatus.

11. An electronic apparatus, comprising:
    a light emitting apparatus according to claim 10; and
    a control unit which controls an emitting state of said light emitting apparatus.

12. A method for controlling a capacitor charging apparatus, including a transformer and an output capacitor charged with current flowing through a secondary coil of the transformer, which charges the output capacitor by performing a switching control of a switching transistor provided on a path leading to a primary coil of the transformer, the method comprising:
    detecting a primary current flowing through the primary coil of the transformer; and
    outputting to a control terminal of the switching transistor a switching signal for specifying ON to the switching transistor until the primary current reaches a predetermined peak current value and then specifying OFF to the switching transistor during an off-time; and
    adjusting the switching signal outputted to the control terminal of the switching transistor, according to the predetermined peak current value, wherein the switching transistor is a bipolar transistor, and
    a current value of a base current, which is supplied to a base of the bipolar transistor as the switching signal, is adjusted in accordance with the predetermined peak current value.

* * * * *